United States Patent [19]

Collins

[11] Patent Number: 4,487,085
[45] Date of Patent: Dec. 11, 1984

[54] INFINITELY VARIABLE GEAR RATIO TRANSMISSION

[76] Inventor: Clifford H. Collins, 701 Monroe Way, Placentia, Calif. 92760

[21] Appl. No.: 220,421

[22] Filed: Dec. 29, 1980

[51] Int. Cl.³ .............................................. F16H 29/04
[52] U.S. Cl. ........................................ 74/113; 74/117; 74/125.5
[58] Field of Search .................... 74/63, 112, 113, 114, 74/125.5, 122, 568 R, 750 B, 54; 64/21

[56] References Cited

U.S. PATENT DOCUMENTS

| | | | |
|---|---|---|---|
| 637,477 | 11/1899 | Newman | 74/113 |
| 1,856,007 | 4/1932 | Von Soden-Fraunhofen | 74/114 |
| 2,036,133 | 3/1936 | Goltsch | 74/114 |
| 2,159,739 | 5/1939 | Johnson | 74/568 |
| 2,295,337 | 9/1942 | Derrah | 74/113 |
| 2,521,067 | 9/1950 | Kenison | 74/117 |
| 2,743,804 | 5/1956 | Roberts | 192/48 |
| 2,921,451 | 1/1960 | Helmke | 64/21 |
| 3,006,205 | 10/1982 | Platt | 74/125 |
| 3,222,941 | 12/1965 | Winslow | 74/55 |
| 3,353,418 | 11/1967 | Okcuoglu | 74/125.5 |
| 3,364,794 | 1/1968 | Ishioka | 74/113 |
| 3,447,391 | 6/1969 | Hargreaves et al. | 74/125.5 |
| 3,623,376 | 11/1971 | Call | 74/125.5 |
| 3,722,305 | 3/1973 | Walters et al. | 74/125.5 |
| 3,750,485 | 8/1973 | Blakemore | 74/125.5 |
| 3,864,985 | 2/1975 | Bradley et al. | 74/125.5 |
| 3,881,367 | 5/1975 | Call | 74/681 |
| 4,181,043 | 1/1980 | Waddington | 74/750 B |

FOREIGN PATENT DOCUMENTS

| | | | |
|---|---|---|---|
| 512932 | 10/1920 | France | 74/63 |
| 596078 | 7/1925 | France | 74/113 |
| 778227 | 12/1934 | France | 74/114 |
| 332259 | 8/1958 | Switzerland | |
| 3773 | of 1898 | United Kingdom | |

Primary Examiner—Lawrence J. Staab
Attorney, Agent, or Firm—Knobbe, Martens, Olson & Bear

[57] ABSTRACT

An infinitely variable gear ratio transmission includes plural cam followers driven to oscillate by a rotating cam. The oscillatory motion of the cam followers is combined through plural clutches to provide an output drive. The cam includes at least one surface formed to rotate the cam followers at a constant velocity when the cam rotates at a constant velocity, thereby permitting the output drive to be smooth. The cam is tapered from one end to the other to permit the gear ratio of the transmission to be varied in infinite increments by adjusting the position of the cam relative to the followers. Means for manually or automatically adjusting the gear ratio is provided. Increased gear ratios may be obtained by separating the physical location of the follower mounting shaft from the rotational axis of the follower arms. A universal joint, formed to uniformly transmit rotational velocity, is included to connect the inclined follower shafts to the output drive. The follower arms are oriented relative to the cam such that the chords of follower movement during contact of the follower with the constant velocity surface, at various gear ratios, are mutually parallel, and the chord of such follower movement at the highest gear ratio passes through the center of rotation of the cam.

An alternative embodiment of the present invention further includes cooperating clutches which permit transmission of unidirectional shaft rotation between an input shaft and an output shaft regardless of the direction of torque applied to the shafts.

52 Claims, 32 Drawing Figures

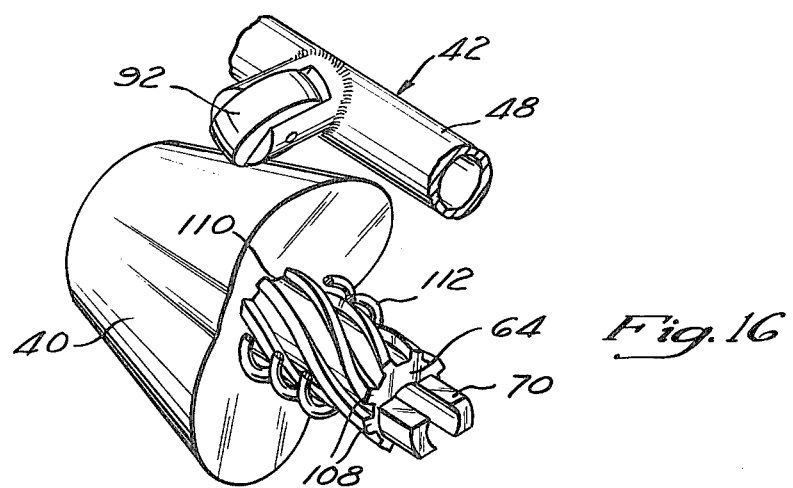

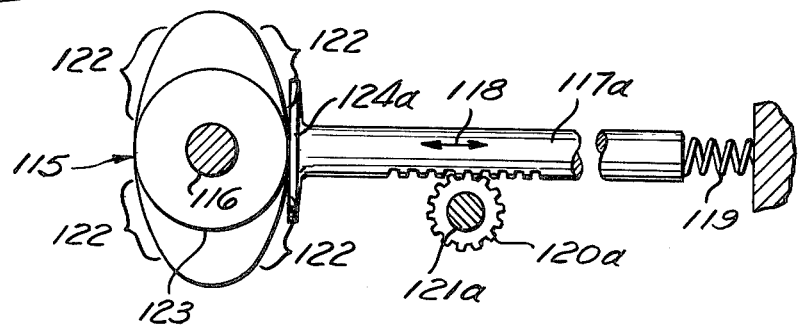
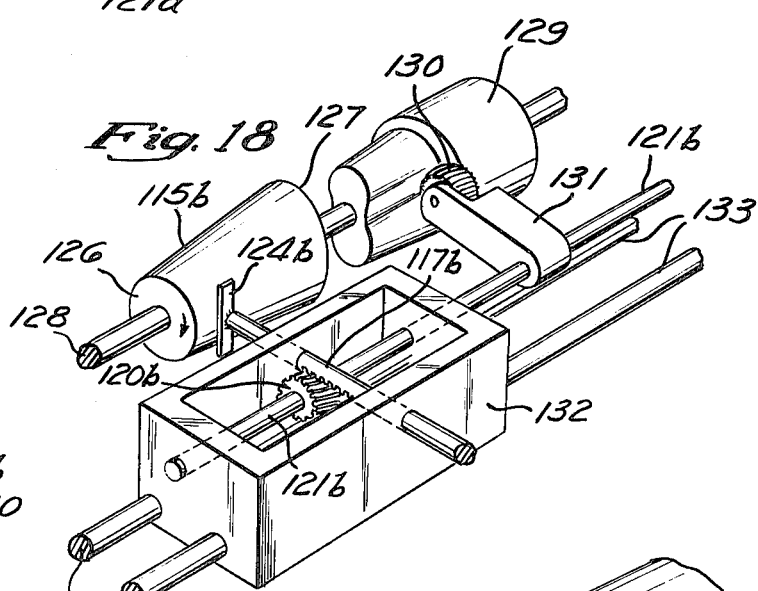
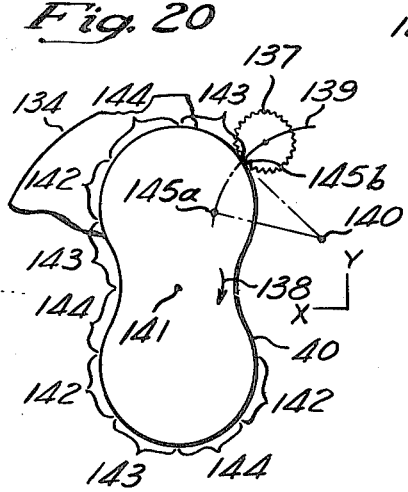
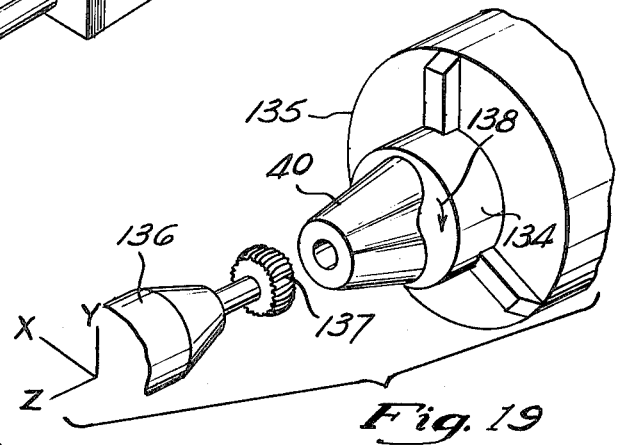
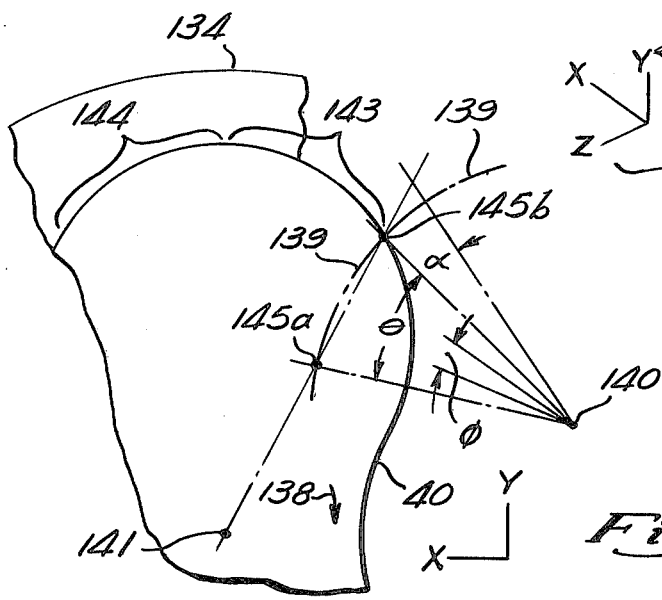

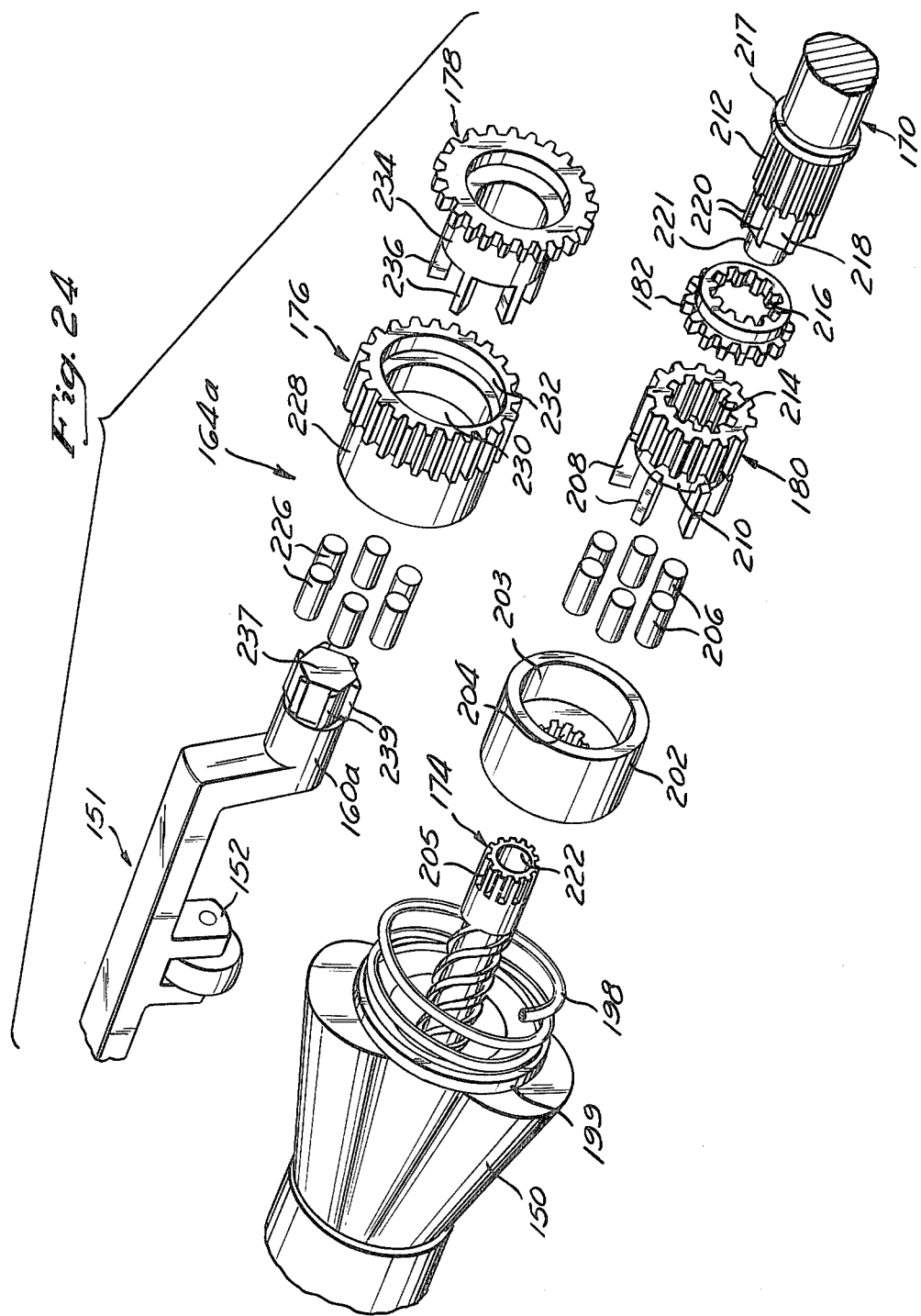

INFINITELY VARIABLE GEAR RATIO TRANSMISSION

BACKGROUND OF THE INVENTION

This invention relates to mechanically driven, infinitely variable gear ratio transmissions.

The need for a practical, infinitely variable gear ratio transmission has been recognized for years, since such a transmission permits selection of the gear ratio which results in the most energy efficient transmission of power from the source to the load.

The infinitely variable gear ratio transmissions of the prior art focus primarily on friction drive arrangements. For example, one type of friction drive transmission includes two conical pulleys, having parallel axes but opposite taper directions, connected by a belt, and mounted on an input shaft and an output shaft, respectively. The conical shape of the pulleys permits the gear ratio of the transmission to be changed by moving the belt in the direction of the conical axes. A modification of this transmission eliminates the need for a belt by providing conical wheels on the input and output shafts which frictionally engage an intermediate roller. The gear ratio of this transmission may be changed by changing the relative position of the wheels and the intermediate roller. Many other types of friction drive transmission have been disclosed, however, all have a common problem in that the friction drive is subject to slippage, particularly when high torque is applied. Thus, the friction drive transmissions are inherently inefficient and torque limited, and any benefits derived from infinitely variable gearing are largely offset by these inadequacies.

The prior art has endeavored to overcome the disadvantages of the friction drive by providing means for nonfrictionally connecting the input shaft to drive the output shaft. Such means, for example, may include one-way clutches mounted on the output shaft, which positively engage the output shaft when driven in one direction but overrun the shaft when driven in the opposite direction. These clutches may be driven by a plurality of cam followers which are oscillated by a rotating cam. Although these locking one-way clutches have some transmission losses associated with them due to play or backlash, such losses are small compared to the losses of dynamic friction drive transmissions, especially when high torque is applied. Thus, use of the one-way clutches significantly improves the efficiency of the transmission.

As previously mentioned, these clutches, and thus, the output shaft, are typically driven by a plurality of cam followers oscillated by a rotating cam. As the cam rotates, its eccentrics oscillate each of the followers sequentially, and therefore, only one follower supplies power to the output shaft at any given moment. However, the follower oscillations in these prior art transmissions typically occur at a sinusoidally varying velocity. Thus, since only one follower drives the output shaft at a time, their sinusoidally varying velocity will be transmitted to the output shaft. This creates undulations in the output shaft velocity, thereby causing the output to be rough. The prior art discloses that the output can be smoothed to some extent by adding more followers, however, this increases the complexity and cost of the transmission.

In addition, since the rotation of each follower varies essentially sinusoidally, the torque capability of the transmission is limited to that which can be handled by a single follower/clutch combination.

The gear ratio of this type of prior art transmission is determined by the magnitude of oscillation of the follower arms relative to the amount of cam rotation. The magnitude of follower arm oscillation may be increased by moving the rotational axis of the cam and the rotational axis of the follower arm closer together. However, the rotational axis of the cam is coincident with its physical axis, and the rotational axis of the follower arm is typically coincident with the physical axis of the shaft which supports it. Therefore, the proximity of the two rotational axes is physically constrained, since the cam and follower rotational axes cannot be so close together that the cam will strike the shaft supporting the follower arm. This fact limits the applications of such transmissions to those which allow a significant gear reduction within the transmission itself. While such reduction can be overcome, in some applications, by providing a correcting, non-variable transmission in the drive line, this is accomplished only at the expense of decreased efficiency and increased cost, i.e., greater transmission complexity.

SUMMARY OF THE INVENTION

The present invention alleviates these and other difficulties of the prior art by providing a cam which includes a driving cam lobe surface formed to oscillate a plurality of follower arms at a uniform or constant velocity. The cam lobe is designed to permit the angular velocity of the follower arm oscillations, during their respective driving phases, to be constant for any selected gear ratio. Thus, the constant velocity cam prevents velocity undulations in the followers, and therefore, avoids the rough output associated with prior art transmissions. As used herein, the term "constant velocity" means that, if the cam is rotating at a constant velocity, the follower arm, when driven, will also rotate at a constant velocity. Of course, if the angular velocity of the cam varies, that of the follower arm will vary proportionately.

As in the prior art, the angular velocity of each follower arm is transmitted to the output shaft by means of one-way clutches, with gears interposed to combine the periodic motion of each follower arm to provide a smoothly continuous output shaft rotation. Elastomeric inserts are included in these one-way clutches to effectively eliminate play and backlash.

The rotational axis of each follower arm may be inclined towards the cam relative to the respective shafts which support them by offsetting the pivotal connections at one end of the follower arm shafts. This permits the cam to pass through the follower rotational axis without being physically constrained by the follower arm shaft. Therefore, such offset permits the rotational axis of the cam and rotational axes of the follower arms to be closer together than would otherwise be possible. Since the proximity of the rotational axes of the cam and follower determines the gear ratio, such inclination and/or separation of the follower rotational axis from the physical axis of its supporting shaft, therefore, permits the gear ratio to be increased. The term "gear ratio", as it appears herein, is used in its general sense as referring to the ratio of input velocity to output velocity, and without regard to the type of means used to transmit such velocity.

As previously mentioned, the shafts supporting the follower arms are connected by gears and respective one-way clutches to drive the output shaft. Since the follower arm shafts are inclined from their respective rotational axes, as described above, the shafts are connected to their respective gears by flexible connectors, such as universal joints. However, standard universal joints are unsuitable for the present invention since, as is well known, they typically do not transmit rotational velocity uniformly and without variation. Therefore, the present invention includes a constant velocity universal joint to connect the follower arm shafts to their respective gears. Such constant velocity universal joint permits the transmission of velocity between the shafts and their respective gears to be synchronous.

The follower arms are oriented relative to the cam such that the chords of follower movement during contact of the follower with the constant velocity surface, at various gear ratios are mutually parallel, and the chord of such follower movement at the highest gear ratio passes through the center of rotation of the cam. This geometric relationship reduces non-productive forces on the follower to the greatest extent possible, consistent with the requirement that the transmission be functional with reverse-direction cam rotation.

The cam is rotatably mounted on an input shaft, and has a lobe which is tapered, from one end of the cam to the other, to provide varying lobe heights. Thus, by changing the relative position of the follower arms and the cam in the direction of the cam input shaft axis, the oscillation angle of the follower may be varied. The magnitude of oscillations, therefore, will vary according to such relative movement. Since the magnitude of follower oscillations, for a given cam rotation, determines the gear ratio of the transmission, the gear ratio may be adjusted by such relative movement.

Such adjustment of the gear ratio may be accomplished either manually or automatically. For example, manual adjustment may be provided by mounting the cam on the input shaft in a manner which allows the cam to slide, as on a spline, along the input shaft. The cam may then be spring biased along the input shaft, and a cable may be attached to the spring-biased cam to permit the position of the cam on the input shaft to be adjusted by tensioning the cable. Automatic adjustment of the cam position may be accomplished by providing a helical spline on the input shaft and spring biasing the cam towards one end of the spline. As torque is applied to drive the cam, such torque will be resisted by the load, thereby causing the cam to rotate along the helical spline toward a position of lower gear ratio. Such movement will continue to lower the gear ratio until the force of the biasing spring prevents further rotation. Thus, the present invention provides for automatic adjustment of the gear ratio in response to the torque applied to the input shaft.

The present invention may be adapted for use in a variety of devices. For example, it may be used as a bicycle transmission, a winch, an automobile transmission, and a speed control device for constant speed motors. In certain of these applications, however, it is necessary to provide means for transmitting torque through the transmission in either direction. For example, it is apparent that all transmissions transmit torque from an input shaft to an output shaft to permit a power source to drive a load. However, some transmissions, such as automobile tranmissions, also transmit torque from the output shaft to the input shaft to permit the power source to brake the load. This occurs, for example, when an automobile, propelled only by momentum, coasts with the transmission in gear. These two types of torque will be referred to herein as "driving torque" and "braking torque", respectively.

Accordingly, an alernative embodiment of the present invention permits transfer of both driving torque and braking torque by providing pairs of clutches which selectively engage or disengage depending on the type of torque applied to the input and output shafts. One pair of clutches is connected to the input and output main drive shafts, respectively. A cam shaft, having a cam mounted thereon, is interposed between the drive shafts, with each of its ends connected to a respective one of the drive shaft clutches. The cam drives a plurality of followers at a constant velocity, in the manner previously described. The other pairs of clutches are connected to the ends of the follower shafts. Each of these two clutches includes an integral gear, referred to herein as an input follower gear and an output follower gear, respectively, which mesh with corresponding gears on the input and output shafts, respectively. When the power source supplies driving torque to drive the load, the drive shaft clutches connect the input shaft to the cam shaft and simultaneously disconnect the output shaft from the cam shaft. Thus, the input shaft drives the cam and thereby oscillates the followers. The follower clutches concomitantly connect the output follower gear to drive the output shaft gear, and disconnect the input follower gear from driving or being driven by the input shaft gear. Thus, the input shaft drives the cam and thereby oscillates the followers which drive the output shaft.

When the power source supplies braking torque to brake the load, the drive shaft clutches disconnect the input shaft from the cam shaft and simultaneously connect the output shaft to the cam shaft. Thus, the output shaft, rather than the input shaft, now drives the cam and oscillates the followers. Concomitantly, the follower clutches disconnect the follower output gear to drive the input shaft gear. Thus, the output shaft drives the cam which oscillates the followers, and thereby drives the input shaft. However, since the output shaft is connected to the load, and, therefore, is driven only by the momentum of the load, the braking torque supplied by the power source will brake the output shaft.

Thus, the present invention permits transfer of braking torque from the output shaft to the input shaft, as well as driving torque from the input shaft to the output shaft.

DESCRIPTION OF THE DRAWINGS

These and other advantages of the present invention are best understood through reference to the drawings, in which:

FIG. 7 is a partial cross-sectional view taken along the lines 7—7 of FIG. 6;

FIG. 16 is a partial perspective view of the bicycle transmission of FIG. 12 showing the cam mounted on a helical spline;

FIG. 17 is a schematic drawing of a rack and pinion being driven by a cam which has portions of its surface formed as involutes of a base circle;

FIG. 18 is a schematic drawing, showing a cam, rack, and pinion similar to those of FIG. 17 being used to drive a grinding wheel to generate the constant velocity surfaces of the cam of FIG. 12;

FIG. 19 is a schematic drawing of the grinding wheel of a numerically controlled grinding machine being used to generate the constant velocity, constant acceleration, and constant deceleration surfaces of the cam of FIG. 12;

FIG. 20 is a schematic drawing showing the constant velocity surfaces, acceleration surfaces, and deceleration surfaces of the cam of FIG. 12;

FIG. 20A is a fragmentary view of the schematic drawing of FIG. 20 illustrating the motion of the grinding wheel relative to the cam as it grinds the constant velocity, acceleration, and deceleration surfaces of the cam of FIG. 12;

FIG. 24 is an exploded view of one of the drive shaft clutches and one of the follower clutches, shown in FIG. 23;

DETAILED DESCRIPTION OF THE PREFERRED EMBODIMENT

The basic principles upon which the present invention operates will be developed through reference to FIGS. 1 through 11.

Figure 1:
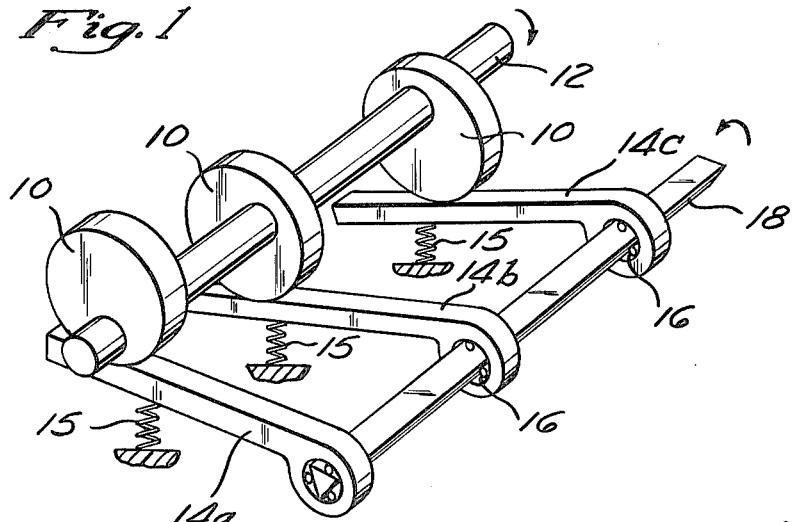
FIG. 1 is a perspective, schematic view of a prior art transmission comprising an input shaft having three cams spaced 120 degrees with respect to each other, and three follower arms connected to drive an output shaft through one-way clutches.
Figure 2:
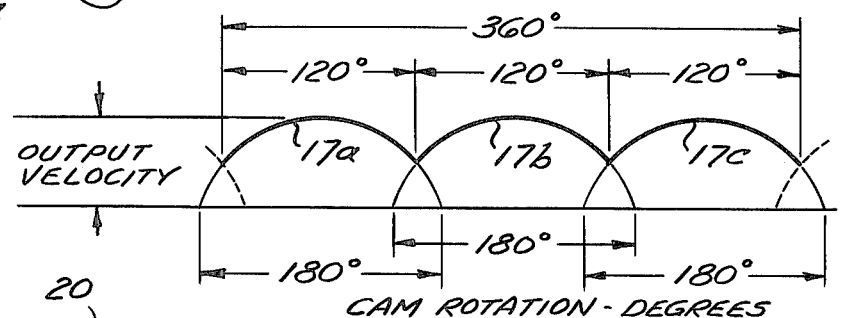
FIG. 2 is a graph of follower velocity versus degrees of cam rotation for the transmission of FIG. 1.

Referring initially to the prior art transmission of FIG. 1, three circular cams 10 are each eccentrically mounted on an input shaft 12. The cams 10 are positioned to align with three respective follower arms 14. As the cams 10 rotate, the follower arms 14 are repeatedly driven away from, and returned toward, the input shaft 12. Thus, the cams 10 oscillate the followers 14. The return or retraction of the follower arms 14 is accomplished by biasing the followers 14 against their respective cams 10 by biasing compression springs 15. The eccentrics of the cams 10 are oriented 120 degrees with respect to each other to permit the follower arm oscillations to be sequential.

The follower arms 14 are connected to the output shaft 18 through respective one-way clutches 16. When the cams 10 drive the follower arms 14 away from the output shaft 12, the clutches 16 engage the output shaft 18, thereby causing it to rotate. However, when the followers 14 return or retract toward the input shaft 12, the one-way clutches overrun the output shaft 18. Thus, the cams 10 drive the output shaft 18 by sequentially oscillating their respective followers 14.

The gear ratio of the transmission may be calculated by dividing the input shaft velocity by the output shaft velocity. Since the velocity of the output shaft 18 is determined by the magnitude of oscillation of the followers 14, the gear ratio can be changed by varying the magnitude of such oscillations. This may be accomplished by changing the position of the shaft 12 relative to the shaft 18. Thus, as the shaft 12 is moved closer to the shaft 18, the oscillations will increase in magnitude, and, therefore, the output velocity of output shaft 18 will increase. This same effect is realizable, of course, by increasing the size or eccentricity of the cams 10. Conversely, when the distance between the shafts 12 and 18 is increased, or the cam eccentricity reduced, the magnitude of the oscillations will decrease, and the velocity of the shaft 18 will decrease. Therefore, the gear ratio is determined by the cam eccentricity, and the distance between the shafts 12,18. However, it is apparent that the minimum distance between the two shafts 12,18 is limited by the size of the cam eccentrics, since the eccentrics will strike the shaft 18 if the shafts 12,18 are too close, and thus, the gear ratio of the transmission is also limited.

Since the cams 10 are circular, they will generate oscillations that are sinusoidal, thereby causing the velocity of the output shaft 18 to also be sinusoidal. This is graphically illustrated by FIG. 2 which shows the velocity of each of the followers 14 as they are driven by the cam 10. The curve 17a represents the angular velocity of the follower arm 14a, the curve wave 17b that of follower 14b, and 17c that of follower 14c. Since the output shaft will be rotated by the most rapidly rotating clutch 16, the heavy solid line represents the velocity of the output shaft 18 through 360 degrees of input shaft 12 rotation. Thus, since each of the followers 14a, 14b, and 14c successively becomes the most rapidly rotating, the followers 14 sequentially drive the shaft 18. Therefore, it may be seen that the circular cams 10 impart sinusoidal undulations to the output shaft 18, thereby producing a rough output when the input rotation of the shaft 12 is smooth.

Figure 3:
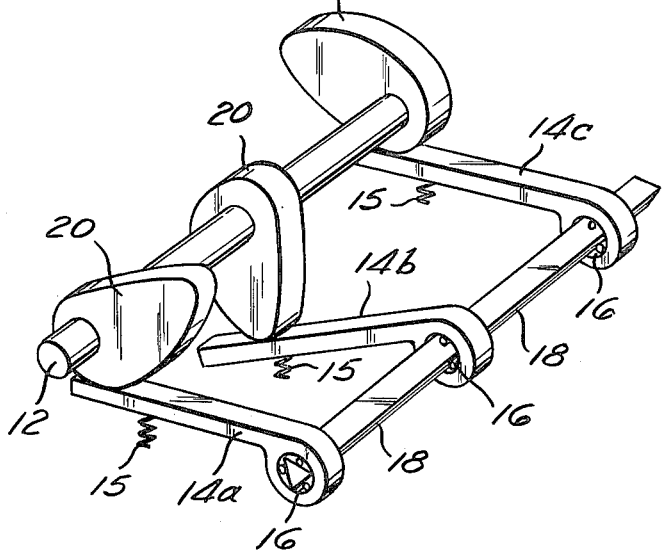
FIG. 3 is a perspective, schematic view similar to the transmission of FIG. 1, but including single lobed, constant velocity cams in accordance with the present invention.

Referring now to FIG. 3, the circular cams 10 of FIG. 1, in accordance with the present invention, are replaced by irregularly shaped cams 20. As with the transmission of FIG. 1, the eccentrics of the cams 20 are offset with respect to each other by an angle of 120 degrees to permit sequential driving of the follower arms 14, and the followers 14 are connected through respective one-way clutches 16 to drive the output shaft 18. However, the cams 20 are contoured to lift the followers 14 through 270 degrees of cam rotation with at least 120 degrees of that lift delivering a continuous, constant velocity. Such constant velocity lift is transmitted sequentially through the one-way clutches 16 to the output shaft 18. This is illustrated by the curves 17(a) through 17(c) of FIG. 4 which show the velocity of each of the follower arms 14a through 14c, respectively, as they successively drive the output shaft 18. Thus, it can be seen that, since each of the three cams 20 provides 120 degrees of constant velocity lift to their respective followers 14, the output shaft velocity, illustrated by the heavy solid line, will be constant and continuous. The cams 20, therefore, eliminate the sinusoidal undulations in output velocity associated with the circular cams 10 (FIG. 1).

Figure 4:
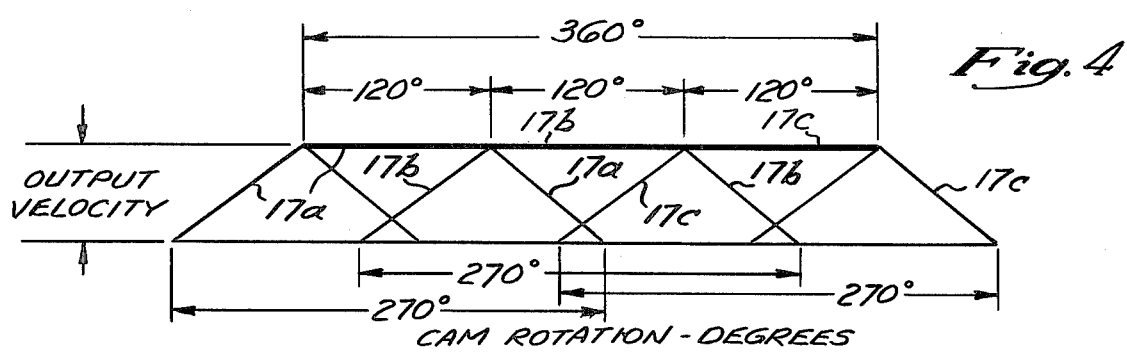
FIG. 4 is a graph of follower velocity versus degrees of cam rotation for the transmission shown in FIG. 3.
Figure 5:
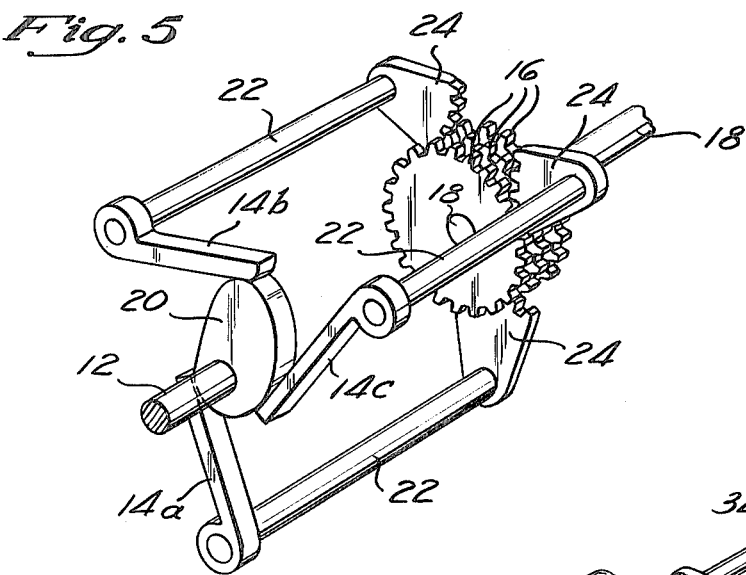
FIG. 5 is a perspective, schematic view of a varient of the transmission shown in FIG. 3 comprising one constant velocity cam oscillating three followers connected through respective gear segments to drive respective one-way clutches on the output shaft.

The triple cam transmission shown in FIG. 3 may be modified to include only a single cam 20 by spacing the three follower arms 14 around the periphery of the cam 20 at an angle of 120 degrees with respect to each other, as shown in FIG. 5. The follower arms 14 are each connected through respective shafts 22 to drive a gear segment 24. The one-way clutches 16 are mounted adjacent to one another on the output shaft 18, and are provided with gear teeth. Each of the clutches 16 are positioned to align with a respective one of the gear segments 24. Thus, the follower oscillations resulting from rotating the cam 20 will be transmitted by the shafts 22 and gear segments 24 to the clutches 16. Since the followers 14 are angularly spaced 120 degrees with respect to each other, the oscillations provided by the cam 20 will drive the clutches 16 sequentially, and thereby provide continuous power to rotate the output shaft 18. Further, since the cam 20 has the same contour as the cam 20 of FIG. 3, it will impart at least 120 degrees of constant velocity lift to each of the followers 14 through 270 degrees of cam rotation. Thus, the single cam transmission of FIG. 5 provides the same constant velocity output (shown in FIG. 4) as the triple cam transmission of FIG. 3.

Although the one-way clutches 16 of FIG. 5 are shown as mounted on the output shaft 18, these clutches 16 may be alternatively mounted on the shafts 22. However, in this case, the gears 24 must be complete gears rather than gear segments, since the clutches 16 will cause the gears 24 to rotate rather than oscillate. Such rotation of these complete gears may be transmitted to the output shaft 18 by providing a central gear (not shown) on the output shaft 18, which meshes with the complete planetary gears. Thus, the transmission of FIG. 5 may be adapted to permit the clutches 16 to be located either together, on the output shaft 18, or on each of the shafts 22, respectively.

Figure 6:
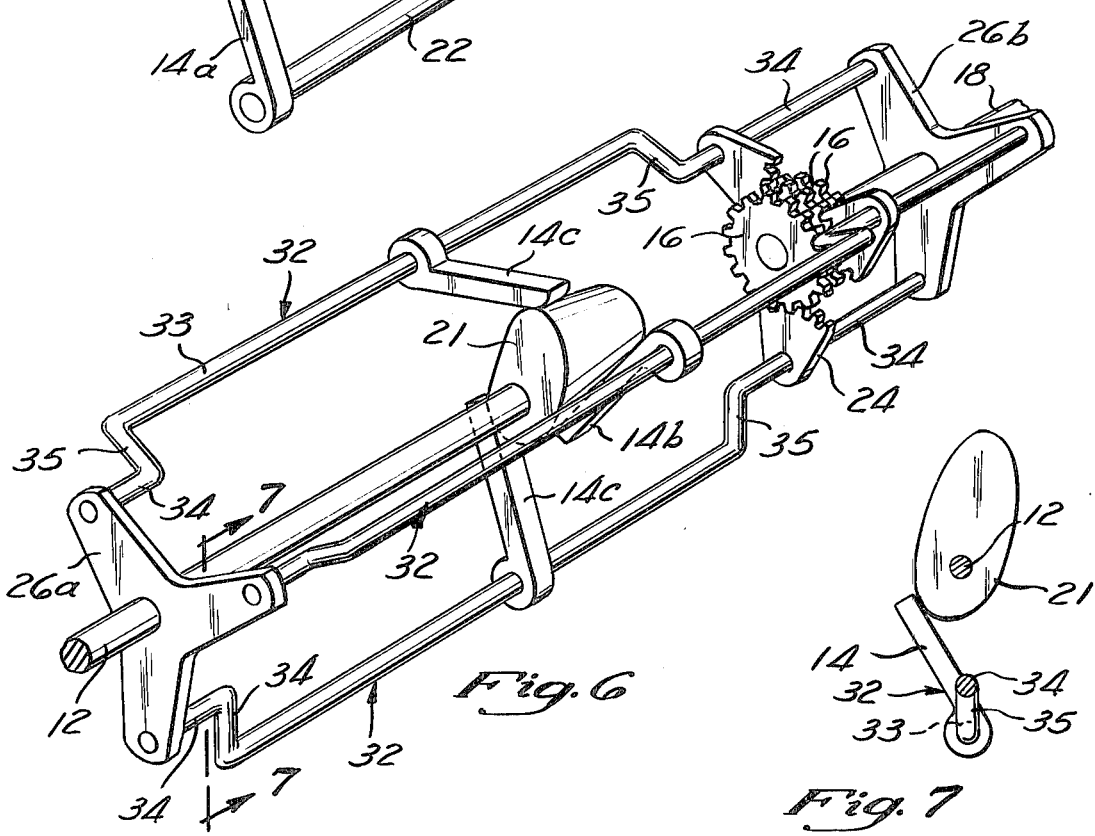
FIG. 6 is a perspective, schematic view of an additional variant of the transmission of FIG. 3 with the followers mounted on cranks rather than straight shafts, and with the constant velocity cam being tapered from a circle on one end to a lobe on the other end.

The transmission of FIG. 5 may be further modified, as shown in FIG. 6, to include additional inventive concepts. Referring to FIG. 6, the follower arm shafts 22 of FIG. 5 may be replaced by modified follower arm shafts 32, each shaped in the form of a crank having a crank pin 33 connected to a crank shaft 34 by a crank arm 35. One end of the crank shafts 34 is rotatably mounted on a plate 26a, while the other end is connected to and extends through the gear segments 24, respectively, and is rotatably mounted on a second plate 26b. The plates 26a and 26b are aligned with each other to permit the axes of rotation of the crank shafts 34 to be coincident with their respective physical axes.

As with the transmission of FIG. 5, the clutches 16 are mounted on the output shaft 18 and are positioned to permit each of them to be driven by a respective one of the gear segments 24. The output shaft shaft 18 extends through the center of the plate 26b and is rotatably mounted in it, while the input shaft 12 is connected to a cam 21 and extends through and is rotatably mounted in the center of the plate 26a. The followers 14a through 14c are connected to a respective one of the crank pins 33, and the follower arm shafts 32 are angularly spaced 120 degrees relative to one another to permit the followers 14 to be driven sequentially. Thus, by rotating the cam 21, the followers 14 will oscillate about the crank shaft 34 axis, and the gear segments 24 will concommitantly oscillate to sequentially drive the clutches 16.

The operation of this transmission, therefore, is identical to the transmission of FIG. 5. The major difference between the two transmissions is that the follower arm shafts 32 of FIG. 6 are shaped as cranks, while the follower arm shafts 22 of the FIG. 5 transmission are straight. The purpose of the crank-shaped shafts 32 is to permit attaining higher grear ratios. Referring back to FIG. 1, it will be recalled that increased gear ratios may be attained by increasing the magnitude of follower oscillations. Thus, forming the shafts 32 in the shape of a crank, permits the driving point of the cam 21 to be closer to the follower axis of rotation than would otherwise be possible, since, as illustrated by FIG. 7, the follower arm shaft 32 does not physically constrain the proximity of the cam driving point with the follower rotational axis. Therefore, the crank-shaped shaft 32 permits the transmission of FIG. 6 to attain higher gear ratios than the transmission of FIG. 5. In essence, the use of the crank-shaped shaft 32 allows the nose of the cam 21 to rotate through the rotational axis of the shaft 32, permitting closer placement of the rotational axis 34 and the cam axis, yielding a high gear ratio.

Figure 8:
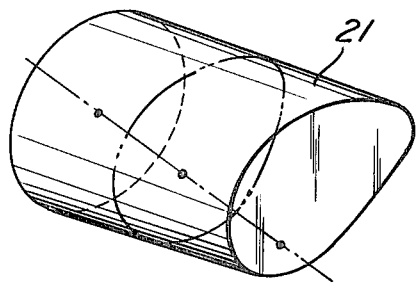
FIG. 8 is a perspective view of the constant velocity single lobed cam shown in the transmission of FIG. 6.
Figure 9:
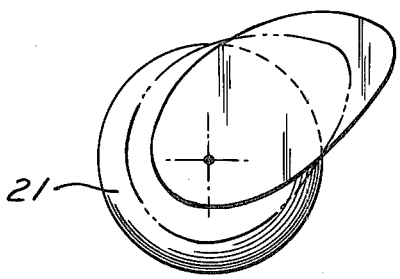
FIG. 9 is a plan view of the constant velocity single lobed cam of FIG. 8.

The cam 21 of FIG. 6 is tapered from a circle on one end to a lobe on the other end, as shown in FIGS. 8 and 9. Thus, the cam 21 varies in lobe height from zero at its circular end to a maximum at its lobed end. By permitting the cam 21 to slide along the input shaft 12, the followers 14 will align along the face of the cam 21 at locations which exhibit varying degrees of cam lobe height. Therefore, when the followers 14 are aligned with the lobed end of the cam 21, the magnitude of the follower oscillations will be the greatest. As the cam 21 slides along the input shaft 12, the cam lobe height and concommitant follower oscillations will gradually decrease until the followers 14 align with the circular end of the cam 21, where the oscillations will cease. Thus, since the magnitude of the follower oscillations is proportional to the gear ratio, such sliding movement of the cam 21 permits the gear ratio of the transmission to be adjusted in infinitely small increments, through a range varying from a maximum when the followers 14 are aligned with the lobed end of the cam 21 to neutral when the followers 14 are aligned with its circular end.

Figure 12:
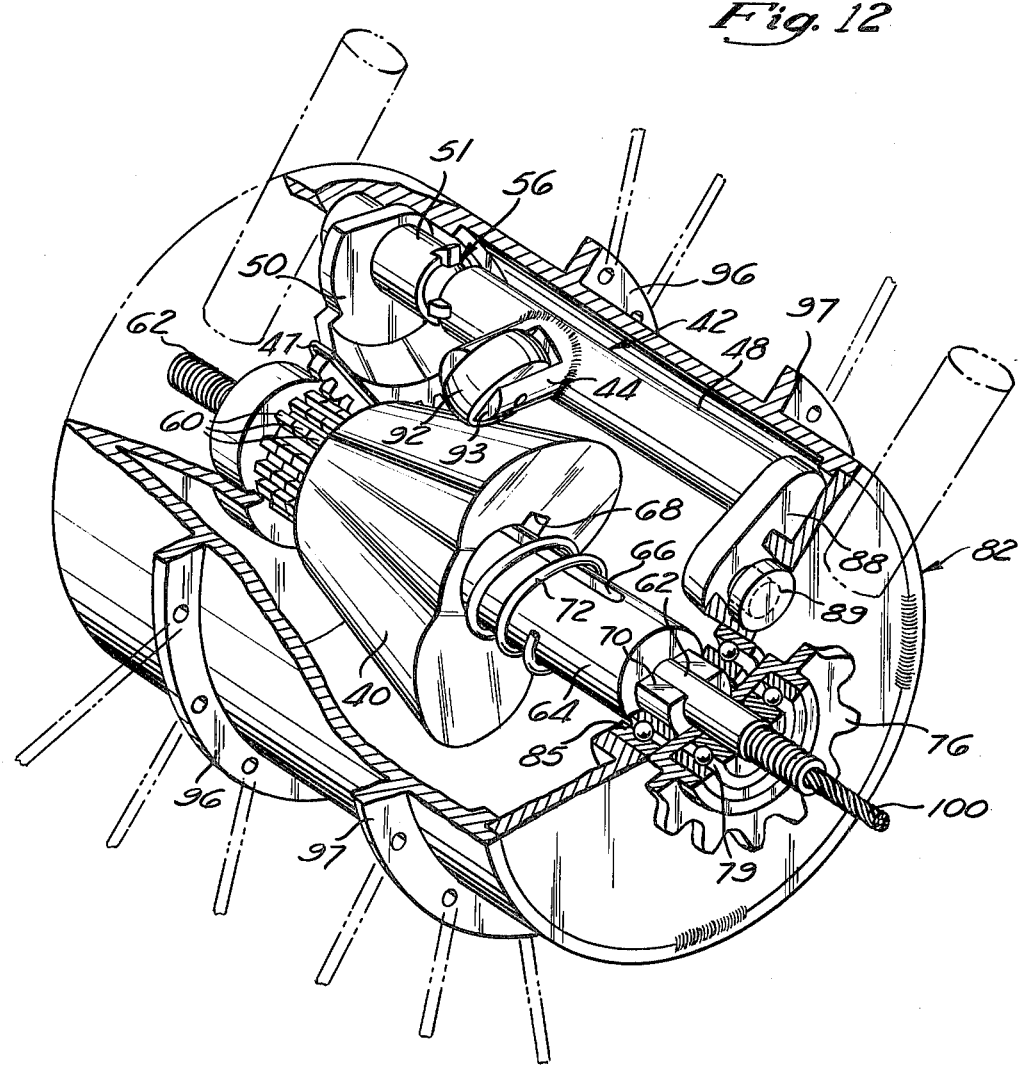
FIG. 12 is a partial perspective view of a bicycle transmission with its housing partially cut away to illustrate the relationship among the cam, clutches, and follower arm assembly.

Although the cam 21 of FIG. 6 is a single lobed cam, a double lobed cam, such as a cam 40, illustrated by FIG. 12, may be used alternatively. The double lobed cam 40 is preferable to a single lobed cam 21 since the double lobed cam 40 is capable of oscillating the followers 14 twice per cam revolution, in contrast to once per revolution for a single lobed cam 21.

The lift rate of the cam defines the gear ratio, for a given follower arm length. The lift rate and cam lift duration define the overall cam size, and thus the minimum follower arm length. Thus, assuming that the double lobed cam 40 produces the same magnitude of follower oscillations in one-half revolution that the single lobed cam 21 provides in a full revolution, the double lobed cam 40 allows a doubling of the lift rate with a given overall cam size, and a given follower arm length. Because the gear ratio is equal to the ratio of the magnitude of follower oscillations to the cam lift duration, the double lobed cam 40 is, therefore, capable of producing a higher gear ratio with fewer followers than a single lobe cam.

However, regardless of whether a single or double lobed cam is used, the transmission must be capable of providing continuous, smooth and uniform output power. Achieving such output power depends on the contour of the cam and on the number of followers used. For example, if a single lobed cam is used in a triple follower transmission, such as the transmissions illustrated in FIGS. 5 and 6, the cam must be capable of oscillating the followers sequentially to provide 120 degrees of constant velocity cam lift to each follower, as shown in FIG. 4. That is, the lift delivered to each follower must be at a constant velocity during a 120-degree portion cam rotation. FIG. 4 illustrates that such constant velocity portion of the cam lift may occur through a total of 270 degrees of cam lift contour. However, by changing the contour of the cam to more rapidly accelerate to, and decelerate from, constant velocity lift, it is possible to provide 180 degrees of constant velocity lift through the same 270 degrees of cam rotation. This will permit the number of followers to be reduced to two, assuming that they are angularly spaced 180 degrees with respect to each other to permit them to be sequentially driven by the cam. Thus, by changing the constant velocity characteristics of the cam, a single lobed cam may be capable of providing continuous constant velocity lift with only two followers instead of three.

Figure 10:
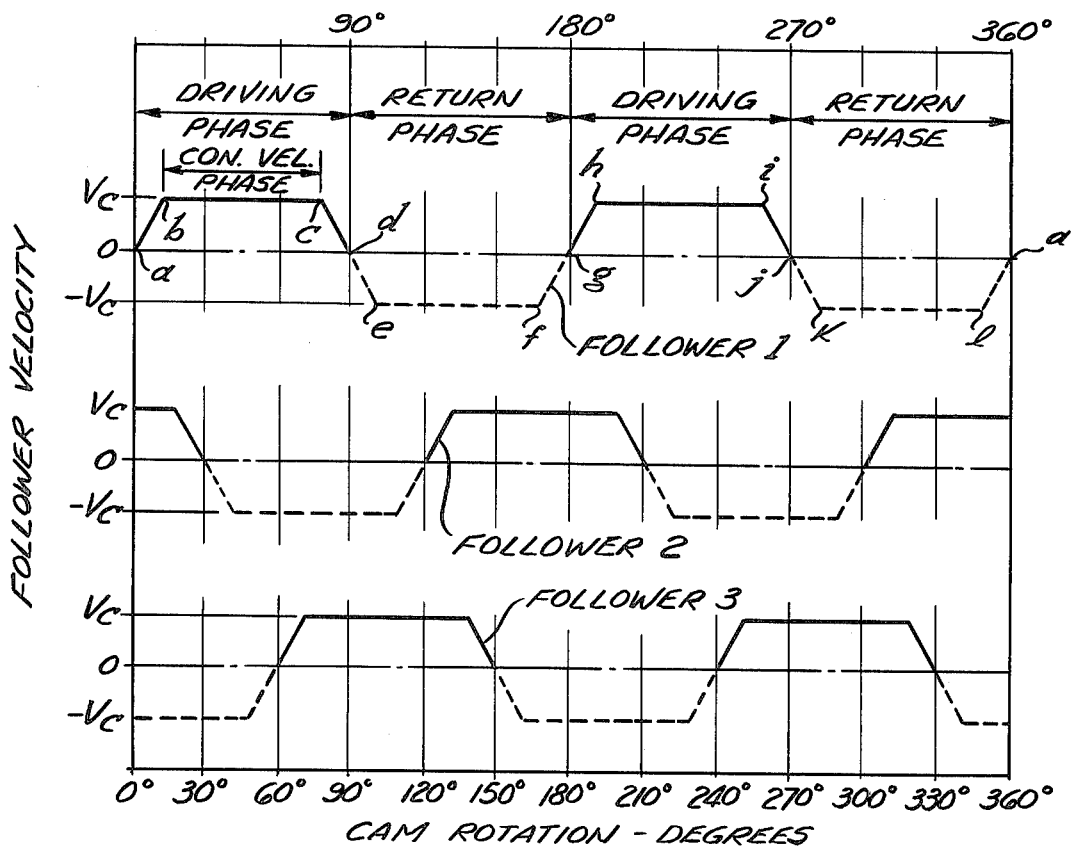
FIG. 10 is a series of graphs of follower velocity versus degrees of cam rotation for a triple follower transmission with a double lobed, constant velocity cam.
Figure 10A:
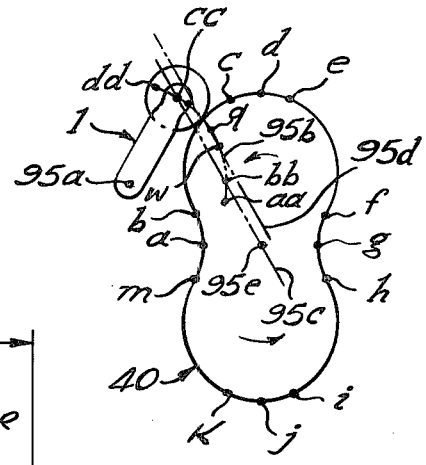
FIG. 10A is a schematic drawing showing the geometric and driving relationship between the cam of FIG. 12 and one of the followers.

If a double lobed cam is used in a triple follower transmission, the double lobed cam, like the single lobed cam, must also be capable of delivering constant velocity lift to each of the followers through at least 120 degrees of cam rotation. However, since a double lobed cam has two lobes, each lobe need only provide constant velocity through 60 degrees of cam rotation. This is illustrated by the three graphs of FIG. 10 which show follower velocity versus degrees of cam rotation for each of three followers, labeled Follower 1, Follower 2, and Follower 3, respectively. The Follower 1 is shown in FIG. 10A, as it is being deiven by a double lobed cam 40 (FIG. 12). The graph of FIG. 10 is labeled with points (a) through (l) which correspond to the points (a) through (m) of FIG. 10A. The points (a) through (m) of FIG. 10A correspond to a series of driving points, i.e., the point at which the follower contacts the peripheral surface of the cam. Referring now to both FIGS. 10 and 10A, when the driving point is at point (a), the Follower 1 has fully returned or retracted against the cam. Thus, as the cam rotates to move the driving point from point (a) through point (b), the follower will be accelerated. Such acceleration continues until a velocity $V_c$ is reached at point (b). The velocity $V_c$ is sustained and held constant from point (b) to point (c). At point (c), the Follower 1 velocity begins to decrease and falls to zero at point (d). Thus, the points (a) through (d) represent a 90-degree driving phase through which the follower is lifted, with part of such lift being at a constant velocity, $V_c$. As the driving point moves from point (d) to point (e), the follower will begin to move in a direction opposite that of its driving phase.

Assuming that the cam lobes are symmetrical, such movement will continue at a constant velocity $-V_c$ from point (e) to point (f). At point (f), the velocity gradually decreases until, at point (g), the velocity is zero and the Follower 1 has fully retracted. Thus, points (d) through (g) represent a 90-degree return phase during which the follower retracts to enable it to respond to the driving phase of the second of the two lobes. The driving phase (g), (h), (i), (j), and the return phase (j), (k), (m), (a) of the second lobe are similar in duration and velocity to those of the first lobe. Therefore, the double lobed cam oscillates the Follower 1 twice during one cam revolution.

The followers 2 and 3 (not shown) are also oscillated twice, in a manner similar to that of Follower 1, as shown in their respective FIG. 10 graphs. However, since the three followers are spaced at an angular distance of 120 degrees with respect to each other, the oscillations of Follower 2 will occur 120 degrees after those of Follower 1 and those of Follower 3 will occur 120 degrees after those of Follower 2. Thus, it can be seen from FIG. 10 that the double lobed cam oscillates each of the followers sequentially. Further, such sequential oscillations permit the output velocity to remain uniform and continuous so long as the constant velocity portion of the respective driving phases overlap. Since there are a total of six follower oscillations per cam revolution, and 360 degrees per cam revolution, such overlap will occur when the constant velocity portion of such oscillations is at least 60 degrees. Thus, in order for a transmission having a double lobed cam and three followers to deliver continuous and uniform output power, the cam must be contoured to permit each cam lobe to sequentially deliver at least 60 degrees constant velocity lift per follower oscillation.

From the foregoing, it is apparent that continuous and uniform output power will reslt from various other combinations of cam contours and numbers of followers. For example, a double lobed cam may be used with only two followers, instead of three, by contouring each of the two cam lobes to provide 90 degrees of constant velocity lift per follower oscillation. Examples of other follower and cam contour arrangements will be apparent to those skilled in the art. A procedure for machining a double lobed cam to a contour which permits attaining the requisite constant velocity output will be described subsequently.

Referring back to FIG. 6, it will be recalled that the transmission gear ratio may be varied by tapering the cam 21 from one end to the other to provide varying degrees of cam lobe height. Thus, as the cam 21 is moved along the input shaft 12, it imparts oscillations to the followers 14 which vary according to the cam lobe height at the driving point. Therefore, since the magnitude of follower oscillations determines the gear ratio, such movement of the cam 21 will change the gear ratio of the transmission. In addition, the number of followers and constant velocity characteristics of the cam may be chosen to permit the transmission to deliver uniform continuous output power with a minimum of two follower/clutch combinations supplying such power at all times. This increases the torque capability of the transmission significantly, since two follower/clutch combinations can handle higher torque than a single follower/clutch combination.

Figure 11:
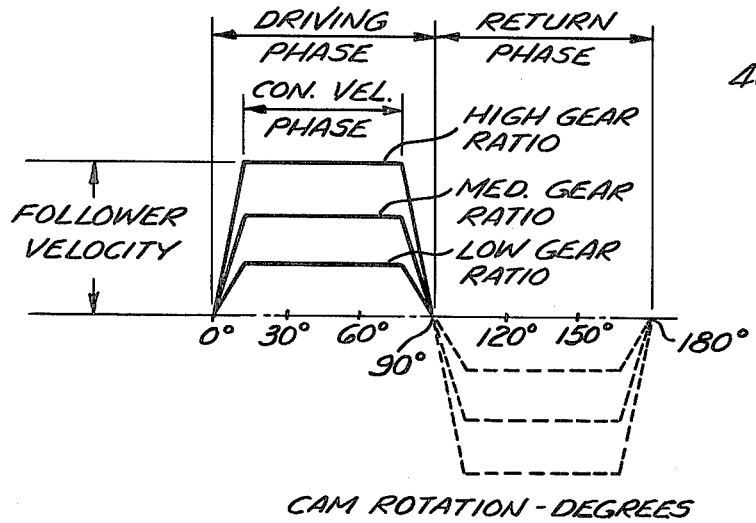
FIG. 11 is a graph of follower velocity versus degrees of cam rotation illustrating the effect of changing gear ratios.

Referring now to FIG. 11, the effect of changing gear ratios on the follower oscillations will be described. FIG. 11 is a graph illustrating the changes in the Follower 1 velocity of FIG. 10 through 180 degrees of cam rotation, as the gear ratio is varied. To understand the reasons for such velocity changes, it will be recalled that, as the gear ratio is increased, the magnitude of the follower oscillations concommitantly increases. Further, assuming the cam is rotating at a constant velocity, such follower oscillations must occur during a constant time period, regardless of their magnitude. Thus, if the gear ratio is increased, the follower velocity must increase to permit the follower to travel through a concommitantly greater oscillation in the constant period of time. Therefore, the velocity of follower oscillations will be proportional to their magnitude. Since the magnitude of follower oscillations varies according to the gear ratio, the follower velocity, therefore, will also vary according to the gear ratio, as shown in the FIG. 11. However, the cam is contoured to permit the follower to maintain a constant velocity through the same number of degrees of cam rotation regardless of the gear ratio. Thus, changing the gear ratio will not change the duration of constant velocity lift, nor will it alter the sequential driving characteristics discussed in reference to FIG. 10. Therefore, smooth, uniform and continuous power is provided at all gear ratios.

The foregoing discussion illustrates many of the basic concepts and operating principles of the present invention. However, the present invention includes additional features and refinements which will be described in reference to the bicycle transmission shown in FIG. 12.

The transmission of FIG. 12 includes a double lobed cam 40 with its lobe height tapered from one end to the other, and three follower assemblies 42. The follower assemblies 42, shown in an exploded view in FIG. 13, each include a follower arm 44 mounted on a shaft 48, and a gear segment 50 connected to the shaft 48 by a universal joint 56. Although only one follower assembly 42 is shown in the transmission of FIG. 12, it will be understood that there are three such follower assemblies 42, each of which is spaced around the cam 40 at an angular distance of 120 degrees relative to the others to permit the cam 40 to oscillate the follower arms 44 sequentially. Coil biasing springs 47 (FIG. 13) bias their respective follower arms 44 against the face of the cam 40 to permit them to return after being lifted. The gear segments 50 are positioned to drive respective one-way clutches 60, mounted on an output shaft or spindle 62. Thus, as the cam 40 rotates, it will oscillate the follower arms 44, and such oscillations are respectively transmitted by the gear segments 50 to drive respective clutches 60. Therefore, the basic operation of the transmission of FIG. 12 is similar to the transmission of FIG. 6.

It will be understood that the biasing springs 47 are merely illustrative of one type of follower biasing device. For example, the follower arms 44 may be alternatively biased against the cam 40 by providing respective additional cam followers disposed 90 degrees from the follower assemblies 42. Since the cam 40 is symmetrical, such disposition of these additional biasing followers permits the cam 40 to oscillate them in a direction opposite the follower assemblies 42. Thus, when the follower assemblies 42 are rotating clockwise, the biasing followers rotate counterclockwise, and vice versa. Further, it is apparent that such disposition of the biasing followers permits their follower arms to retract when the arms 44 of the follower assemblies 42 are driven and to be driven when the arms 44 retract. Therefore, by connecting the biasing followers to the follower assemblies in a manner which permits them to oscillate in opposite directions, each will bias the other against the cam 40. Such method of biasing is well known in the art, and other means for biasing the follower arms 44 against the cam 40 will be apparent to those skilled in the art.

Figure 14:
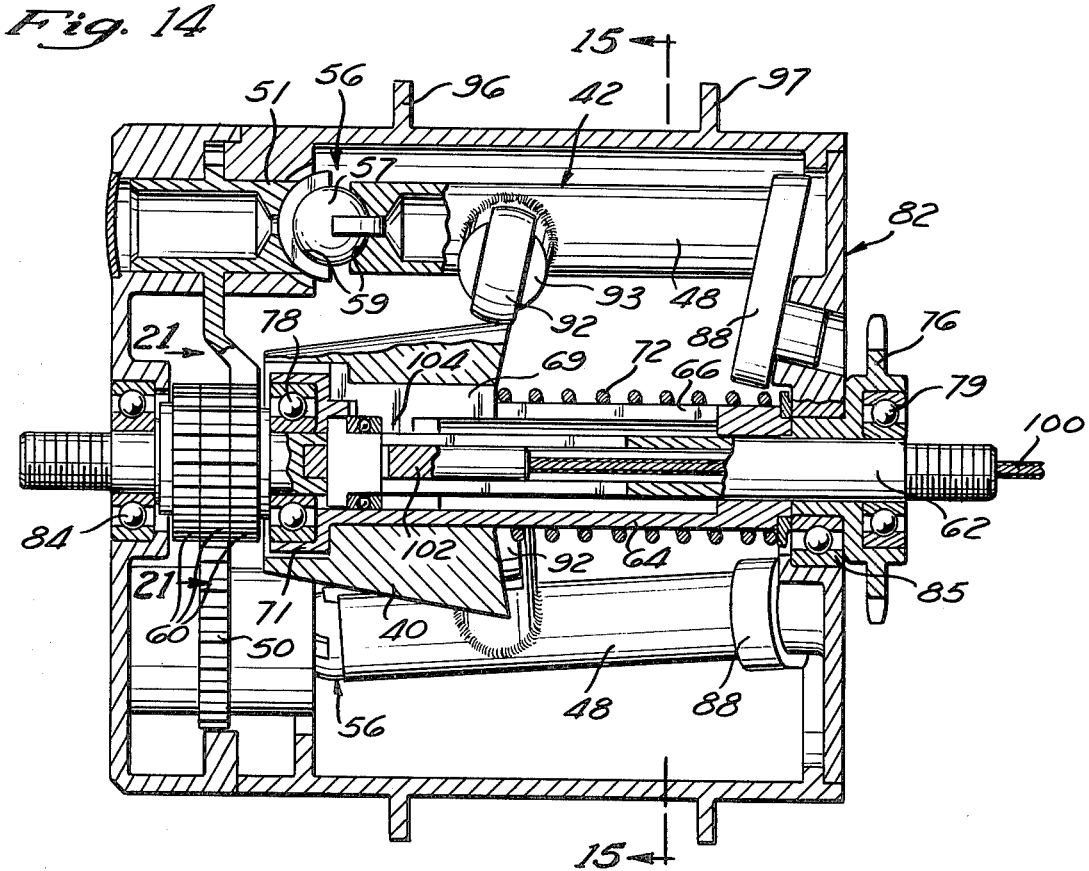
FIG. 14 is an elevation view in cross-section of the bicycle transmission of FIG. 12 taken along the lines 14—14 of FIG. 15.
Figure 15:
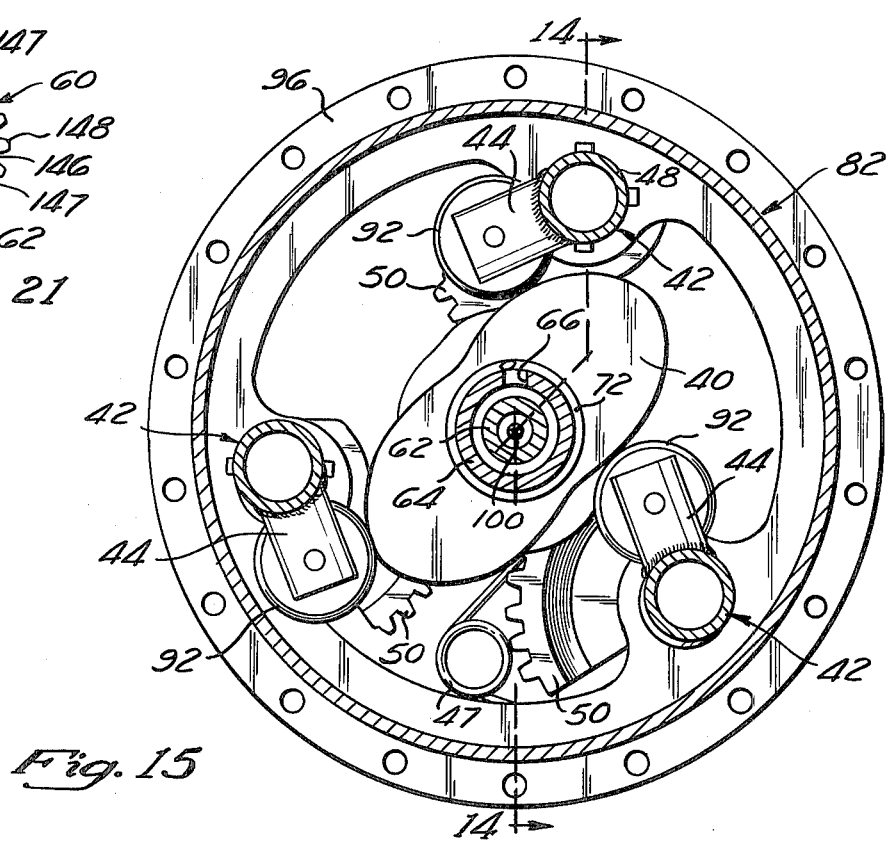
FIG. 15 is an elevation view in cross-section taken along the lines 15—15 of FIG. 14.

Referring to FIGS. 12, 14, and 15, the cam 40 has a bore through its axis to permit it to be mounted on an input shaft or sleeve 64. The sleeve 64 has a keyway 66 parallel to its axis which is aligned with an opposing keyway 68 in the bore of the cam 40. A key 69 (FIG. 14) is inserted into the two opposing keyways 66,68 to permit the cam 40 to slide along the axis of the sleeve 64 while preventing the cam 40 from rotating about the sleeve 64. The sleeve 64 is sized to coaxially telescope on the spindle 62 to permit it to rotate thereon. A lug 70 is provided on one end of the sleeve 64 while a collar 71 (FIG. 14) is provided on the opposite end. The circular end of the cam 40 is biased against the collar 71 by means of a helical biasing spring 72, and the sleeve 64 is rotatably mounted on the spindle 62 with the collar 71 being adjacent to the one-way clutches 60. A chain sprocket 76 is mounted on the lug 70 to permit a bicycle chain (not shown) to drive the sleeve 64 and thereby rotate the cam 40.

A first set of bearings 78,78 (FIG. 14) is provided to permit the sleeve 64 to rotate freely about the spindle 62. The sleeve 64 and spindle 62 are mounted in a cylindrical housing 82, with the ends of the spindle 62 protruding from the ends of the housing 82. A second set of bearings 84,85 is provided to permit the housing 82 to rotate freely about the sleeve 64 and spindle 62. Thus, the sleeve 64 and the housing 82 are each independently rotatable with respect to the spindle 62.

As previously mentioned, the follower arm 44 is attached to a shaft 48, one end of which is mounted to the gear segment 50 through the universal joint 56. The other end of the shaft 48, however, is pivotally connected to the housing 82 by a crank arm 88 to permit the axis of shaft 48 rotation to be offset from its physical axis (FIG. 14). Such offset inclines the shaft 48 rotational axis toward the spindle 62 and thereby allows the lobes of the cam 40 to pass through such axis without striking the shaft 48 itself. Since the offset provided by the crank arm 88 permits close proximity of the driving point and the rotational axis, the magnitude of follower oscillations will be greater than would otherwise be possible. Further, since the magnitude of follower oscillations determines the gear ratio of the transmission, such offset provides increased gear ratios.

Each follower arm 44 includes a spherical roller 92 mounted on a pin within a yoke 93. The spherical roller 92 is merely illustrative of one type of follower arm construction, and other types will be apparent to those skilled in the art.

The follower arms 44 are preferably oriented relative to the cam 40 such that the chords of follower arm movement, during contact of the follower with the constant velocity surface at the highest gear ratio, pass through the center of rotation of the cam 40. Such orientation of the follower arms 44 is schematically illustrated in FIG. 10A which shows the follower 1 mounted for rotation about an axis 95($a$). The axis 95($a$) is positioned relative to the high gear ratio end of the cam 40 so that the nose of the cam 40 (identified as points d and j) will pass therethrough. Although the drawing indicates that the follower 1 physically prevents this from occurring, it will be understood that, in practice, the follower 1 may be crank-shaped so that it does not constrain the cam 40.

As the follower 1 is driven by the high gear ratio end of the cam 40, the center of rotation of the roller of follower 1 travels through an arc 95($b$). That is, this point of the follower 1 travels along the arc 95($b$), for example, from point aa, to point bb, to point cc, to point dd. These points on the arc 95($b$) correspond, for example, to the points a, b, c, and d, respectively, on the surface of the cam 40. Since the cam surface between points b and c represents one of the constant velocity surfaces of the cam 40, the follower 1 will travel at a constant velocity as the follower moves from point bb to point cc. The cam 40 and follower 1 are oriented to permit a chord 95($c$) passing through points bb and cc to also pass through the center of rotation 95($e$) of the cam 40.

In addition, it is also preferable that the follower arms 44 (FIG. 12) and cam 40 are oriented to permit the chords of follower movement, during contact of the follower with the constant velocity surface at various gear ratios, to be mutually parallel. For example, referring to FIG. 10A, at one of such various gear ratios, the follower 1 will rotate through a portion of the arc 95($b$) bounded by points q and w. In such case, a chord 95($d$), passing through the points q and w, is parallel to the chord 95($c$) passing through bb and cc. These geometric relationships reduce non-productive forces on the follower 44 (FIG. 12) to the extent possible, consistent with a requirement that the transmission be functional with reverse direction cam rotation.

Figure 13:
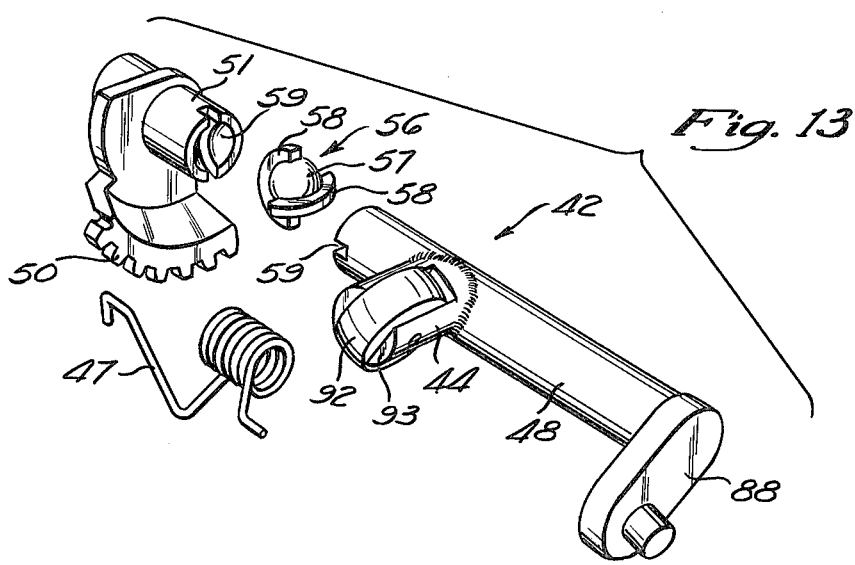
FIG. 13 is an exploded perspective view of the follower arm assembly shown in FIG. 12.

It will be recalled that the follower shaft 48 is inclined from its rotational axis. Thus, the connection between the shaft 48 and gear segment 50 is made by means of a flexible connector, such as a universal joint. However, standard universal joints are unsuitable for the present invention since they typically do not transmit rotational velocity uniformly and without distortion. Therefore, the present invention includes the constant velocity universal joint 56 which transmits the constant velocity oscillations of the shaft 48 to the gear segment 50 in the manner which permits the shaft 48 and gear 50 to rotate synchronously. Referring to FIG. 13, the universal joint 56 comprises a sphere 57 having two diametric semicircular slots, disposed at 90 degrees to each other. A pair of semicircular keys 58, each having a thickness approximately equal to that of one of the slots, and a diameter approximately twice that of the sphere 57, are inserted into the semicircular slots, respectively. The universal joint 56 is received by, and mates with two slotted spherical cavities 59, one of which is in the end of an axle 51 of the gear segment 50, while the other is in the end of the shaft 48 opposite the crank arm 88. Each of the slotted spherical cavities 59 has a slot sized and positioned to slidingly receive a respective one of the keys 58, and has a cavity sized to permit slightly less than one-half of the sphere to fit within it. The universal joint 56 flexibly connects the shafts 48 to their respective gear segments 50, and permits the gear segments 50 to rotate at the same velocity as the physical axis of the shafts 48.

Referring to FIGS. 12, 14, and 15, two flanges 96,97 are formed on the exterior of the housing 82. These flanges 96,97 extend around the periphery of the housing 82, parallel to its ends, and have holes sized and spaced to retain the spokes (shown in phantom) of a bicycle wheel (not shown).

Each end of the spindle 62 is bolted to a respective wheel fork (shown in phantom in FIG. 12) of the bicycle frame. Thus, the spindle 62 is locked so that it cannot rotate. It will be recalled, however, that the sleeve 64 is rotatable with respect to the spindle 62. Therefore, since the sleeve 64 connects the chain sprocket 76 to the cam 40, driving the chain sprocket 76 by turning the bicycle pedals will rotate the cam 40. As the cam 40 rotates, it will cause the follower arm 44 to cyclically lift and return, thereby imparting an oscillating rotary motion to the shaft 48. The follower oscillations are transmitted by the universal joint 56 to the gear segments 50 which drive respective clutches 60. The clutches 60 will attempt to rotate the spindle 62, however, since the spindle 62 is clamped to the bicycle frame, it will not rotate. Therefore, the housing 82, which carries the gears 50, must rotate around the spindle 62. Since the housing 82 is attached to the wheel spokes (shown in phantom), such rotation will drive the bicycle wheel. It should be noted that, since the one-way clutches 60 engage the spindle 62 in only one direction, the housing 82 will rotate in the same direction regardless of the direction of rotation of the cam 40. Thus, the bicycle pedals may be rotated either clockwise or counterclockwise to drive the bicycle forward. However, when the bicycle coasts the cam 40 will be driven by the housing 82, and therefore, the bicycle pedals will rotate. Thus, in order to prevent such rotation of the bicycle pedals, a rachet (not shown) may be included in the chain sprocket 76.

As previously mentioned, the three followers 44 are spaced at an angular distance of 120 degrees relative to each other to permit them to be sequentially driven. Further, the cam 40 is contoured to provide approximately 80 degrees of constant velocity lift per follower oscillation. Therefore, the sequential driving phases of the cam 40 will overlap to provide smooth, uniform, and continuous output power, as discussed in reference to FIGS. 10 and 10A.

Referring to FIGS. 12, 14, and 15, it will be recalled that the smaller end of the cam 40 is spring-biased against the collar 71 (FIG. 14), by the helical biasing spring 72, and that the key 69 (FIG. 14) is inserted into the keyways 66,68 (FIG. 12) to permit the cam 40 to slide along the sleeve 42 while preventing it from rotating thereon. Thus, the cam 40 is normally biased toward its position of highest grear ratio, since, when the cam 40 is adjacent to the collar 71, the follower arm 44 will be aligned with the lobed end of the cam 40, and the cam 40, therefore, will impart maximum oscillations to the follower arm 44. The gear ratio may be reduced to infinitely small increments by providing means for sliding the cam 40 along the sleeve 42, as discussed in reference to FIG. 6. Accordingly, a cable 100 is attached, through a bore in the center of the spindle 62, to a cable termination 102 (FIG. 14). The cable termination 102 has a slot extending around its periphery which receives a projection 104 (FIG. 14) of the key 69. Thus, when the cable 100 is pulled, the cable termination 102, key 69, and cam 40 will slide along the sleeve 64. Consequently, the follower arm 44 aligns with the cam 40 at progressively smaller degrees of cam eccentricity. Therefore, such sliding movement of the cam 40 lowers the gear ratio. When the force applied to the cable 100 is reduced, the helical biasing spring 72 causes the cam 40 to reverse directions, thereby increasing the cam lobe height at the driving point and concommitantly increasing the gear ratio. Thus, the cable 100 and helical spring 72 cooperate to permit the transmission gear ratio to be adjusted. By way of specific example, the cam 40 may be contoured, in a manner described in more detail below, to have lobe heights which produce gear ratios ranging from neutral, at one end of the cam, to about 1:1 at the other end of the cam.

As an alternative to adjusting the gear ratio manually by means of the cable 100, the gear ratio may be adjusted automatically, in response to the torque applied to the cam 40, by providing a helical spline or key 108 on the sleeve 64 which is received by a corresponding helical spline or keyway 110 in the bore of the cam 40, as shown in FIG. 16. Thus, the helical spline permits the cam 40 to rotate about the sleeve 64, and thereby permits the cam 40 to travel along the sleeve 64. A biasing spring 112 biases the cam 40 towards the collar 71 (FIG. 14) to inhibit such rotation. However, such biasing force will be overcome if sufficient torque is applied to drive the cam 40, since, as the cam 40 rotates, the follower arms 44 will resist the driving force of the cam 40. As long as the torque applied against the follower arm 44 is greater than the actual biasing force caused by the interaction of the spring 112 with the helical spline 108,110, the sleeve 64 will rotate more rapidly than the cam 40, thereby causing the cam 40 to travel along the sleeve 64 until the biasing force caused by the interaction of the spring 112 with the helical spline 108,110 is equal to the torque applied against the follower arm 44. At this point of equilibrium, the cam 40 and the sleeve 64 will rotate synchronously, and the transmission will operate normally. Since the gear ratio of the transmission varies as the cam 40 travels along the sleeve 64, the gear ratio, therefore, will be responsive to the torque applied to drive the cam 40. Thus, as the bicyclist applies more force to the pedals, the transmission will automatically adjust to a lower gear ratio. Conversely, as he applies less force to the pedals, the transmission will automatically adjust to a higher gear ratio. Therefore, the transmission is always responsive to a predetermined torque. Such predetermined torque may be adjusted by varying either the pitch of the helical spline, or the force of the biasing spring, or both.

In order to achieve the desired constant velocity characteristics, discussed in reference to FIGS. 10 and 11, cam 40 must be ground or otherwise formed in a manner which will provide a constant velocity rotation in the follower shaft 48. However, because the cam 40 moves the follower 92 in an arcuate path, and thus, the location of the surface of the cam which contacts the follower cannot be determined by the rotational position of the cam alone, the constant velocity contours of the cam 40 are not simply the involutes of a circle, which is the geometry commonly used for constant velocity gear trains. This concept is best understood through reference to FIG. 17 which schematically illustrates a cam 115 mounted on a spindle 116 to drive a gear rack 117(a) which is mounted for linear reciprocation in the direction shown by the arrow 118. The rack 117(a) is biased toward the cam 115 by a spring 119, and drives a pinion gear 120(a) to rotate a shaft 121(a). If the mechanism shown in FIG. 17 were used in the transmission of FIG. 12, such that the pinion 120(a) and its associated shaft 121(a) provided the output rotation in place of the shaft 48 of FIG. 12, the constant velocity portions of the cam 115 indicated by the brackets 122 would be simple involutes of the base circle 123. Those skilled in the art will recognize that if the cam 115 were tapered, as is the cam 40 of FIG. 12, the constant velocity portions 122 along the cam 115 could be generated by providing a gradually decreasing base circle and grinding the cam as an involute of this base circle. The cam would then drive a flat follower 124(a) attached to the rack 117 and, because of the involute geometry 122, would drive the pinion 120(a) at a constant velocity if the cam 115 were rotated a constant velocity.

The arrangement shown in FIG. 17 can also be used to provide the basis for a grinding mechanism for grinding the cam 40 from a blank. Thus, referring to FIG. 18, a tapered cam 115(b) may be formed in the manner described in reference to FIG. 17; that is, as an involute of a base circle for the constant velocity lift portions 122 (FIG. 17) with a varying base circle 123 (FIG. 17) to provide a small end 125 and a large end 127. The cam 115(b) is rotatably mounted on a common spindle 128 with a cam blank 129. A rack follower 117(b), including a flat follower 124(b), may be used to drive a pinion 120(b) to rotate a pinion shaft 121(b). As illustrated in FIG. 17, the shaft 121, because of the involute characteristic of the constant velocity portions of the cam 115, will rotate at constant velocity through the lift portions as the cam 115 is rotated at constant velocity. Thus, if a grinding wheel 130, equal in size and having the spherical shape of the roller 92 (FIG. 12), is mounted on a follower arm 131, rigidly attached to the pinion shaft 121(b), and the follower arm 131 has the same length as the follower arm to be used in the transmission, the grinding wheel 130 will grind the cam blank 129 to the contour necessary to provide the constant lift cam for a rotating follower. In other words, since the cam blank 129 and the pinion shaft 121(b), by definition, are rotating with constant velocity at a rotational ratio defined by the involute base circle of the cam 115(b) and the size of the pinion gear 120(b), the contours formed by the grinding wheel 130 must provide the constant velocity lift contours required for the cam 40 of FIG. 12. If the entire mechanism, including the rack 117(b), pinion 120(b), and pinion shaft 121(b) and its attached follower 131 is mounted on a frame 132 and this frame 132 is positionally adjusted along a pair of stationary guide rods 133, then, as the cam 115(b) and blank 129 are rotated, the contours of the cam 40 (FIG. 12) for the variable gear ratios required in the transmission will be generated.

Referring to FIG. 19, the cam 40 of the transmission of FIG. 12 may also be generated by mounting a cam blank 134 in a rotating chuck 135 and utilizing a numerically controlled grinding machine 136 to move a grinding wheel 137 through the contours required for generating the constant velocity lift characteristic. In this case, the grinding wheel 137 preferably has the same diameter as the follower roller 92 in the transmission of FIG. 12. The motions necessary for grinding the cam are best understood through the schematic illustration of FIG. 20. In that figure, the cam blank 134, mounted within the chuck 135 (FIG. 19), is rotated at a constant velocity, as shown by the arrow 138. As the cam blank 134 is rotated, the grinding wheel 137, at a constant Z position, that is, a constant distance from the chuck 135, is moved by adjusting its x and y coordinates through progressive locations along a circular arc 139. The arc 139 is calculated about a center 140 which is positioned with respect to the center of rotation 141 of the cam blank 134 in precisely the relationship that the follower rotational axis of the actual transmission will bear to the central axis about which the cam 40 of FIG. 12 rotates. If the cam blank 134 is rotated in equal angular increments in the direction 138 and the grinding wheel 137 is positioned at equal increments along the arc 139, the proper lift characteristic will be generated to cause the grinding wheel 137 to cut the blank 134 to the contour of the cam 40 of FIG. 12. The equal increments along the arc 139 are larger at one end of the cam 40 than at the other, and thus the size of the increments is gradually adjusted as the Z-axis of the numerically controlled machine 136 is changed. Thus, for example, if the number of increments used at the large end of the cam is equal to N, and each increment is P degrees, the grinding wheel 137 will be rotated through the angle theta, equal to NP. At the small end of the cam 40, if the number of increments remains N, but the increments are reduced to a smaller angle R, the grinding wheel 137 will be rotated through the angle phi, equal to NR. This is accomplished by making the equal intervals of grinding wheel position progressively smaller as progressive passes are made around the circumference of the cam 40. At all times, however, the incremental rotation of the cam, that is, the rotation of the cam during each of the N increments of follower rotation remains constant.

Those skilled in the art will recognize that there are a variety of other methods which may be used to generate the constant lift portions for the cam 40. It has also been found that it is advantageous to provide constant acceleration cam portions between the constant velocity portions. Thus, referring to FIGS. 20 and 20A, between the constant velocity portions 142, there are constant deceleration portions 143 and constant acceleration portions 144. These portions of the cam are easily generated using the mechanism shown in FIG. 19 by providing outside of the angular arc subtended by theta (FIG. 20A), at one end of the cam, and the angular arc subtended by phi (FIG. 20A) at the other end of the cam, movement of the grinding wheel 137 along an extension of the arc 139 in quadratically decreasing increments as the incremental motion of the cam blank 40 remains constant. Thus, for example, if the grinding wheel 137 has been moved through the angle theta from the position 145(a) at one end of its constant velocity rotation to the position 145(b) at the other end of this constant velocity rotation, the grinding wheel 137 will therefore be moved through an additional angle alpha in linearly decreasing increments as the cam 40 is rotated with the same angular increments utilized during grinding of the constant velocity portion. This will provide the linear deceleration portion 143 for the cam 40. As the cam continues to rotate, the grinding wheel 137 will reverse in direction and, in linearly increasing increments, will progress along the arc 139 back through the angle alpha, the last increment in the linearly increasing acceleration portion 144 being equal to the series of equal increments (P or R) within the angle theta for the constant velocity portion. Thus, the cam 40, provided by this technique, will provide a constant acceleration characteristic between zero velocity and the desired constant velocity, and will then provide a constant velocity lift portion, followed by a constant deceleration portion until the follower comes to rest to begin another acceleration, constant velocity, and deceleration cycle.

Those skilled in the art will recognize that a variety of techniques may be utilized in addition to those shown in FIGS. 17 thorough 20 for generating the contours of the cam, and that once a cam blank is formed, a variety of stamping and molding processes may be used to mass produce the cam 40. In each case, however, the particular cam and follower geometry will be first specified along with the total lift at both ends of the cam to provide the desired gear ratio. Once this geometry is established, the required contours of the cam 40 can be calculated and ground using known techniques.

Figure 21:
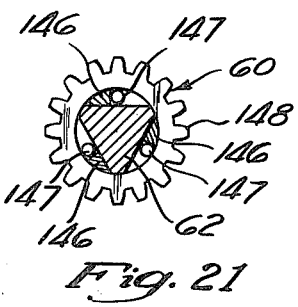
FIG. 21 is a partial elevational view in cross-section taken along the lines 21—21 of FIG. 14, showing one of the clutches.

Referring to FIG. 21, the one-way clutches 60 of the bicycle transmission shown in FIGS. 12, 14, and 15 include three elastomeric inserts 146 to effectively eliminate play or backlash as the clutches 60 engage and disengage the spindle 62. The spindle 62 is essentially triangular with arcuately truncated vertices throughout the axial length of the clutches 60 to form three cavities which provide space for the respective mounting of the three inserts 146 and respective roller bearings 142 between the spindle 62 and a clutch housing 148. The inserts 146 hold their respective roller bearings 147 in a position such that a slight movement of the clutch 60 in the driving direction (i.e., clockwise as viewed in FIG. 21), will cause the bearings 147 to wedge between the spindle 62 and the clutch housing 148. Thus, the inserts 146 permit the clutches 60 to engage the spindle 62 almost instantaneously when rotated in their driving direction. When the clutch 60 is rotated in its overrunning direction (i.e., counterclockwise, as viewed in FIG. 21), such rotation will extricate the roller bearings 147 from their wedged position, and force them against their respective inserts 146. The resiliency of the inserts 146 permits such force by the bearings 147 to deform the inserts 146 sufficiently so that the bearings 147 do not prevent the housing 148 from overrunning the spindle 62. However, when the direction of clutch rotation is reversed, from the overrunning direction to the driving direction, the resiliency of the inserts 146 permits the bearings 147 to immediately return to a position which allows the clutch 60 to instantaneously engage the spindle 62. Thus, the elastomeric inserts 146 effectively eliminate play or backlash as the rotation of the clutch 60 is changed from an overrunning direction to a driving direction.

Figure 22:
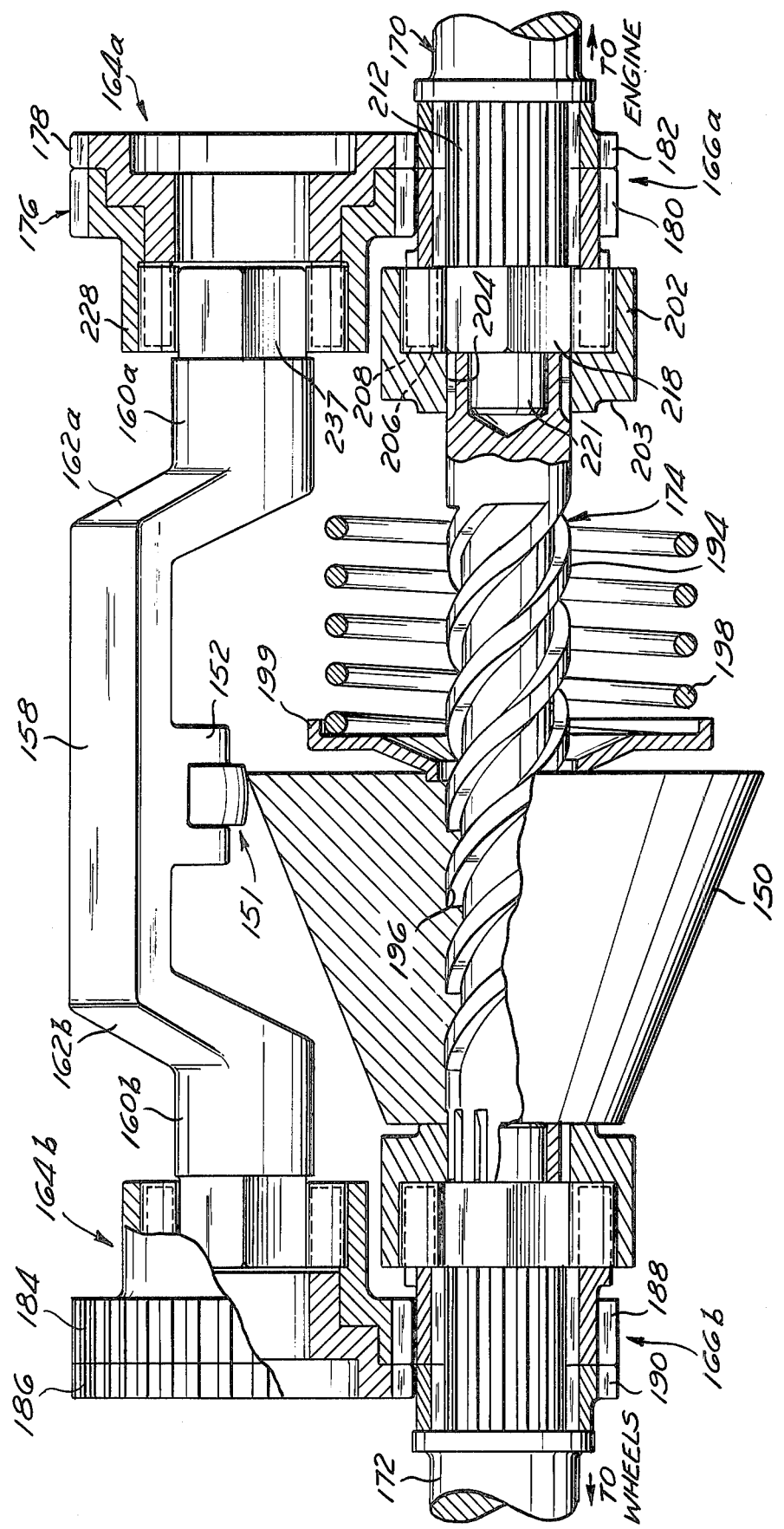
FIG. 22 is a partial elevation view in partial cross-section of an automobile transmission with its housing removed to illustrate the relationship among the cam, clutches, and follower.

Referring to FIG. 22, the present invention includes an embodiment relating to an automobile transmission. This embodiment of the present invention, also shown in a perspective view in FIG. 23, includes a constant velocity double lobed cam 150 and three followers 151 (only one of which is shown). Three biasing springs (not shown) bias the followers 151, respectively, against the cam 150. The cam 150 oscillates the three followers 151 in the manner described in reference to the bicycle transmission of FIG. 12. The followers 151 are spaced 120 degrees relative to each other to permit the cam 150 to drive them sequentially The cam 150 lifts the followers 151 at a constant velocity and, therefore, the followers 151 deliver uniform and continuous output power in the manner described in reference to FIGS. 10 and 11. Each of the followers 151 is comprised of a follower arm 152 mounted on a crank pin 158 which is connected to crank shafts 160a,160b by crank arms 162a,162b, respectively. The crank arms 162 are of equal length to permit the crank pin 158 to be parallel to the crank shaft 160, and thus, to the rotational axis of the follower 151. Therefore, unlike the shaft 48 (FIG. 12), the crank pin 158 is not inclined relative to the follower rotational axis. Thus, since the crank pin 158 is parallel to the follower rotational axis, it is unnecessary to redirect the rotation of the crank pin 58 along the follower rotational axis by means of a constant velocity universal joint, such as the universal joint 56 of FIG. 12.

The ends of the follower crank shafts 160a,160b of each of the three followers 151 are connected to respective one-way clutches 164a,164b. The clutch 164a has two gears 176,178 which mesh with respective gears 180,182 connected to a clutch 166a. Likewise, the clutch 164b has two gears 184,186 which mesh with respective gears 188,190 connected to a clutch 166b. The clutch 166b is a mirror image duplicate of the clutch 166a, and the clutch 164b is a mirror image duplicate of the clutch 164a. The functional relationship between the clutches 164,166 and their respective gears will be described in more detail below. However, it should be presently understood that the gears 176,178 and 184,186 are integral parts of their respective clutches 164a and 164b. Thus, when the clutches 164a and 164b engage their respective shafts 160a and 160b, their respective gears 176,178 and 184,186 will be driven by the shafts 160. The gears 180,182 and 188,190 on the other hand, are splined to an input drive shaft 170 and an output drive shaft 172, respectively. Thus, the gears 180,182 and 188,190 always rotate with their respective shafts 170,172 regardless of whether their respective clutches 166a and 166b are engaged or disengaged.

The clutch 166a connects the input shaft 170 to a cam shaft 174, and the clutch 166b connects the output shaft 172 to the cam shaft 174. An engine (not shown) is connected to the input shaft 170 while the vehicle wheels (not shown) are connected to the output shaft 172 through a differential (not shown). A reversing gear (not shown) may be provided on the output shaft 172 to change the direction that the wheels are driven.

Figure 23:
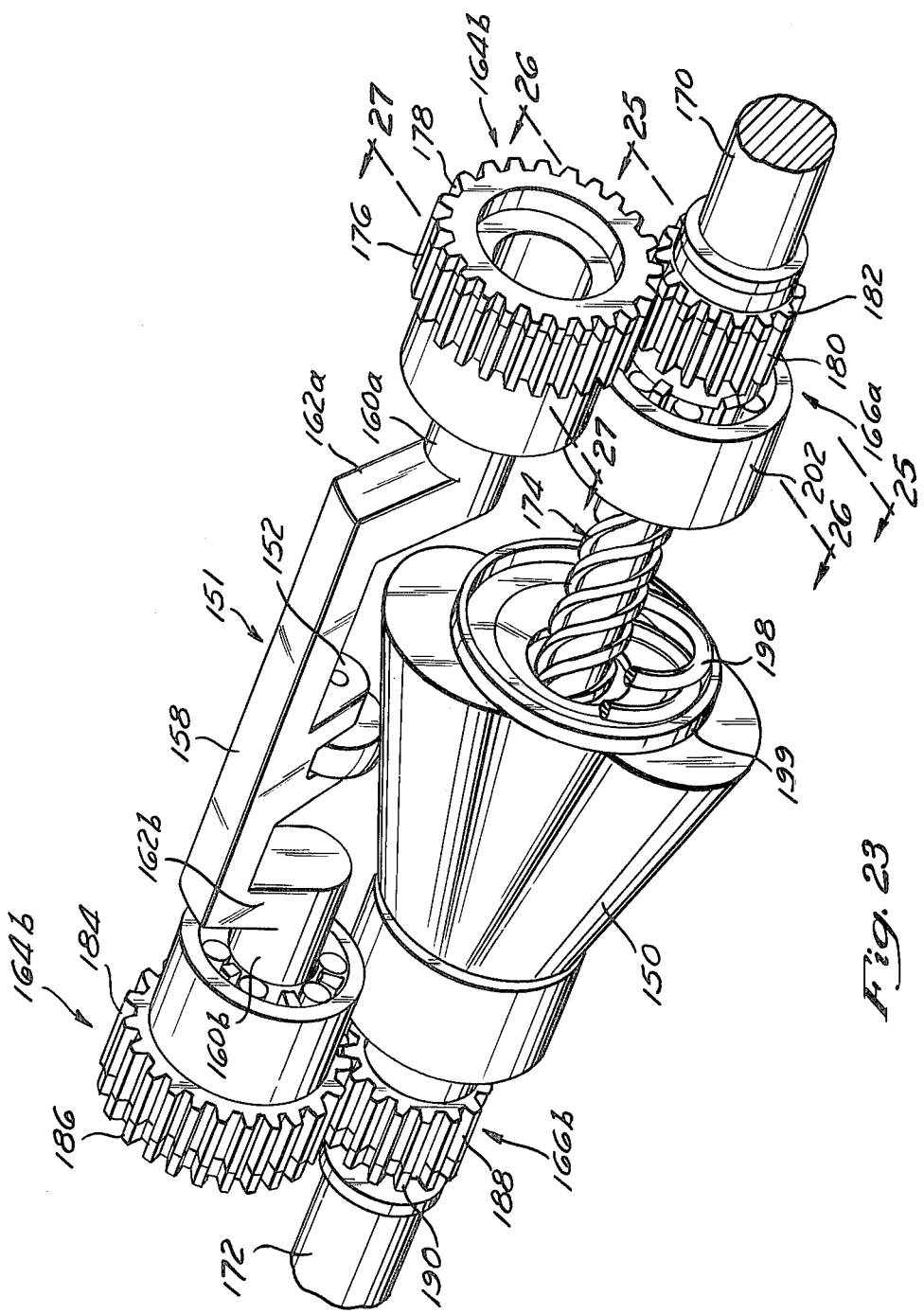
FIG. 23 is a partial perspective view of the transmission of FIG. 22 which provides a reference for describing the direction of rotation of the gears and clutches.

Referring to FIG. 23, the engine drives the input shaft 170 in a clockwise direction. The transmission is adapted in a manner, which will be described in more detail later, to rotate the output shaft 172 in this same direction. The shafts 170,172, however, may be torqued in either a clockwise direction or a counterclockwise direction. For example, when the engine is supplying power to drive the vehicle, the shaft 170 will be torqued in the same direction it is rotating, namely, in a clockwise direction. This type of torque will be referred to as "driving torque". However, when the engine is loading the input shaft 170 to slow the vehicle, the shaft 170 will be torqued in a counterclockwise direction. This occurs, for example, when the engine is throttled back, and the vehicle coasts with the transmission still in gear. In such event, the vehicle wheels, in effect, are supplying driving force to the vehicle and the engine is opposing such driving force to brake the vehicle. Thus, even though both the shafts 170,173 are rotating in a clockwise direction, the shafts 170,172 will be torqued in a counterclockwise direction. This type of torque will be referred to as "braking torque".

The transmission is adapted, in a manner which will described in more detail below, to transmit both driving torque and braking torque between the shafts 170,172 by selectively engaging and disengaging the clutches 164 and 166 from their respective shafts 160 and 170,172.

As previously mentioned, the clutches 164 are connected to the shafts 160 of the follower 151. These clutches 164 engage and disengage the shafts 160 in essentially the same manner as the clutches 60 (FIG. 21) engage and disengage the spindle (FIG. 12). However, unlike the one-way clutches 60, the clutches 164 may operate in either of two modes. In one of these modes, the clutches 164 engage their respective shafts 160 when the shafts 160 rotate in a clockwise direction, and overrun their respective shafts 160 when the shafts 160 rotate in a counterclockwise direction. Thus, in this mode, the clutches 164 function in essentially the same manner as the clutches 60 of FIG. 21. However, in their other mode of operation, the clutches 164 overrun their respective shafts regardless of the direction they are driven. These two modes of operation of the clutches 164 will referred to as the "driving mode" and the "overrunning mode", respectively. The clutches are adapted in a manner which will be described in more detail below, to selectively operate in either the driving mode or the overrunning mode, depending on whether the engine is supplying driving torque or braking torque. Specifically, when driving torque is applied, the clutch 164a operates in the overrunning mode, while the clutch 164b operates in the driving mode. Conversely, when braking torque is applied, the clutch 164a operates in the driving mode, while the clutch 164b operates in the overrunning mode.

In contrast to the clutches 164, the clutches 166 are connected to the clockwise rotating drive shafts 170,172 rather than the oscillating shafts 160 of the follower 151. Thus, the clutches 166 function only to transmit unidirectional rotation rather than oscillations. However, like the clutches 164, the clutches 166 are torque responsive. Specifically, when driving torque is applied, the clutch 166a engages to permit the input shaft 170 to drive the cam shaft 174. Conversely, when braking torque is applied, the clutch 166a disengages to permit the shaft 170 to overrun the cam shaft 174. The clutch 166b, however, always functions in an opposite manner from the clutch 166a. Thus, the clutch 166b connects the output shaft 172 to the cam shaft 174 in response to braking torque, and disconnects the shafts 172,174 in response to driving torque. The clutches 166, therefore, cooperate to selectively connect one or the other of the drive shafts 170,172 to the cam shaft 174.

Based on the foregoing, the operation of the transmission will be described. Referring to FIGS. 22 and 23, and assuming that the engine is supplying driving torque to drive the input shaft 170, the clutch 166a will engage the shaft 170 to connect it to the cam shaft 174. Since the clutch 166b is always disengaged when the clutch 166a is engaged, the clutch 166b will simultaneously disconnect the cam shaft 174 from output shaft 172. Therefore, the cam shaft 174 and cam 150 will be rotated by the input shaft 170. It will be recalled that, since the shaft 170 is splined to the gears 180,182, these gears 180,182 will rotate with the shaft 170. Further, since the gears 180,182 mesh with the gears 176,178, the gears 180,182 will drive the gears 176,178 of the clutch 164a, and, therefore, the gears 176,178 will not drive the shaft 160a. Thus, the clutches 164a,166a cooperate to permit the input shaft 170 to drive the cam shaft 174 and cam 150, while preventing the follower crank shaft 160a from driving the input shaft 170.

When the cam 150 is driven by the input shaft 170, it sequentially oscillates each of the three followers 151. These oscillations are transmitted by the follower crank shafts 160 to the clutches 164. Since the clutch 164a is in the overrunning mode, it will overrun the shaft 160a. However, since the clutch 164b always operates in a different mode from the clutch 164a, the clutch 164b will operate in a driving mode. Thus, the oscillations of the crank shaft 160b will drive the clutch 164b. Since the gears 184,186 are an integral part of the clutch 164b, they will be driven with the clutch 166b and, therefore, the gears 184,186 will drive the gears 188,190. Further, since the gears 188,190 are splined to the output shaft 172, the output shaft 172 will also be driven by gears 184,186. Therefore, the clutch 164b permits the oscillations of the followers 151 to drive the output shaft 172. In such a manner, the driving torque of the engine is transmitted from the input shaft 170 to the output shaft 172 and ultimately to the vehicle wheels. When braking torque, rather than driving torque is applied to the input shaft 170 by the engine, the clutch 166a disconnects the input shaft 170 from the cam shaft 174, while the clutch 166b simultaneously connects the output shaft 172 to the cam shaft 174. Thus, the output shaft 172 will drive the cam shaft 174, and the cam 150 will oscillate the follower 151 and its crank shafts 160. Such braking torque concomitantly causes the clutch 164b to change from a driving mode to an overrunning mode, and the clutch 164a to change from an overrunning mode to a driving mode. Therefore, the oscillating follower crank shafts 160 will drive the clutch 164a and the gears 176,178 and overrun the clutch 164b. Since the gears 176,178 mesh with the gears 180,182, and the gears 180,182 are splined onto the input shaft 170, the follower oscillations will be transmitted to drive the input shaft 170. However, the braking torque on the shaft 170 will resist the driving force imparted to it by the follower oscillations. This braking torque or resistance will be transmitted through the clutch 164a to the follower 141, and, therefore, the follower 151 will impede the rotation of the cam 150. Since the cam 150 is connected to the output shaft 172 through the clutch 166b, the braking torque of the engine will be further transmitted to the shaft 172 and thus to the wheels of the vehicle.

Therefore, this embodiment of the present invention permits both driving torque or braking torque to be transmitted from the engine to the wheels of the vehicle.

It will be recalled that the clutches 164 operate in either a driving mode or an overrunning mode, and that the clutches 166 connect one or the other of the drive shafts 170,172 to the cam shaft 174. The means for accomplishing such operation of the clutches 164,166 will now be described. Referring to FIG. 24, the clutch 166a includes a sleeve or race 202, open on one end and faced with a cap 203 on the other end. The cap 203 has a splined bore 204 which is sized to mate with a corresponding spline 205 on one end of the cam shaft 174.

These two splines 204,205 are of equal length to permit the end of the cam shaft 174 to be flush with the interior of the cap 203.

Figure 25A:
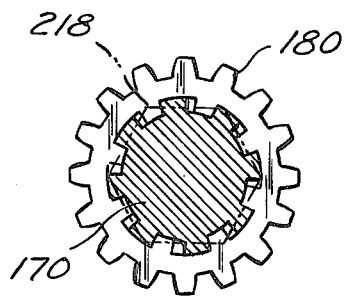
FIGS. 25A and 25B are partial cross-sectional views taken along lines 25—25 of FIG. 23.

The input shaft 170 has a spline 212 sized to mate with corresponding splines in bores 214,216 of the respective gears 180,182. While the gear 182 is splined to fit snugly on the shaft 170, the gear 180 is splined to permit play between the shaft 170 and the gear 180, as shown in FIG. 25A. Thus, the shaft 170 may be rotated a small amount without rotating the gear 180, as illustrated by comparing FIG. 25A with FIG. 25B. Recalling that the engine drives the shaft 170 clockwise, FIGS. 25A and 25B, therefore, illustrate the position of the shaft 170 with respect to the gear 180 when braking torque and driving torque, respectively, are applied to the shaft 170.

Figure 26A:
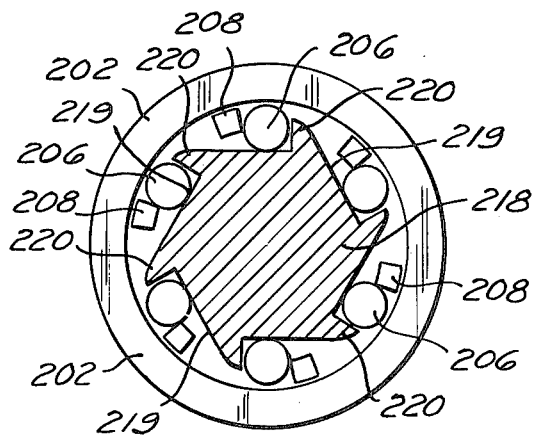
FIGS. 26A and 26B are partial cross-sectional views taken along the lines 26—26 of FIG. 23.

A collar 217 is included on one end of the spline 212 to retain the gears 180,182, while a hexagonal lug 218 is provided on the other end of the spline 212. The hexagonal lug 218 has a length approximately equal to the interior axial length of the sleeve 202 and is sized to permit six bearings 206 to fit between the lug 218 and the interior of the sleeve 202, with each of the bearings 206 resting on a respective one of the flats 219 of the lug 218, as shown in FIG. 26A. Each of the flats 219 of the lug 218 has a retainer or projection 220 to retain the respective rollers 206 in the center of their respective flats 219 when the sleeve 202 rotates clockwise with respect to the lug 218. The retainers 220 function in a manner similar to the inserts 126 of the clutch 60 (FIG. 21) to permit the sleeve 202 to overrun the lug 218 in a clockwise direction.

Figure 25B:
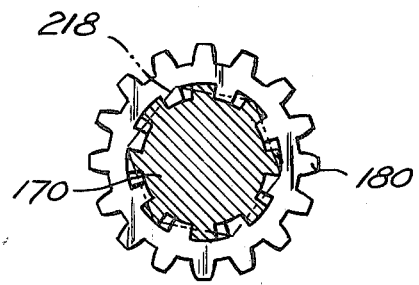

Referring again to FIG. 24, the end of the input shaft 170 is finished in a cylindrical lug 221, which is inserted through the bore 204 of the cap 203, and is rotatably mounted in a bore 222 of the cam shaft 174. The gear 180 has six protrusions 208 which extend axially from a collar 210. These protrusions 208 are sized to fit within the sleeve 202 without touching or inhibiting the rotation of the hexagonal lug 218 or the sleeve 202, and are positioned to permit each of the rollers 206 to be disposed between one of the protrusions 208 and a respective one of the retainers 220, as shown in FIG. 26A. Since the gear 180, to which the protrusions 208 are attached, is splined to permit the input shaft 170 to rotate slightly with respect to the gear 180 in response to braking or driving torque, as shown in FIGS. 25A and 25B, the input shaft 170 will also rotate slightly with respect to the protrusions 208 in response to braking or driving torque.

Figure 26B:
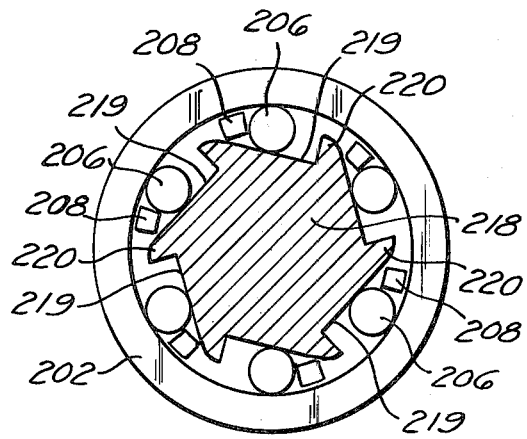

Specifically, when braking torque is applied, the protrusions 208 will retain the rollers 206 in the center of the flats 219 and against the retainers 220, as shown in FIG. 26A. This permits the sleeve 202 to overrun the lug 218 when the sleeve 202 rotates counterclockwise with respect to the lug 218. It will be recalled that the retainers 220 permit the sleeve 202 to overrun the lug 218 when the sleeve 202 rotates clockwise relative to the lug 218. Thus, the sleeve 202 overruns the lug 218 in either direction when braking torque is applied. However, when driving torque is applied, the projections 208 will rotate counterclockwise with respect to the lug 218 as shown in FIG. 26B. This permits the rollers 206 to wedge between the flats 219 and the sleeve 202, and thereby permits the lug 218 to engage the sleeve 202 to drive it clockwise. The clutch 166a, therefore, connects the input shaft 170 to the cam shaft 174 in response to driving torque, as shown in FIG. 26B, and disconnects the shafts 170,174 in response to braking torque, as shown in FIG. 26A.

The gears 188,190 of the clutch 166b are splined to the output shaft 172 in the same manner that the gears 180,182 are splined to the output shaft 172. Thus, the shaft 172 and the gear 190 will rotate slightly with respect to the gear 188 in response to driving torque or braking torque in much the same manner that the shaft 170 and gear 182 rotate relative to the gear 180. However, since the shaft 170 drives while the shaft 172 loads when driving torque is applied, and the shaft 170 loads while the shaft 172 drives when braking torque is applied, the position of the shaft 172 relative to the gear 188 will always be the reverse of the position of the position of the shaft 170 relative to the gear 180. That is, when viewed from the perspective of FIG. 23, the shaft 172 will be positioned relative to the gear 188, as shown in FIG. 25B for braking torque and as shown in FIG. 25A for driving torque. The gear 188 has protrusions (not shown) similar to the protrusions 208 (FIG. 24) which are an integral part of the gear 188. Thus, as the shaft 172 rotates relative to the gear 188, these protrusions will also rotate relative to the gear 188. Since the clutch 166b is a mirror image duplicate of the clutch 166a, and is disposed 180 degrees with respect to the clutch 166a, the protrusions of the clutch 166b will rotate in a direction relative to the shaft 172 opposite that of the protrusions 208 of the clutch 166a. Thus, when driving torque is applied, the protrusions of the clutch 166b will be positioned according to FIG. 27A, and when braking torque is applied, these protrusions will be positioned according to FIG. 27B. Therefore, the clutch 166b will be disengaged when the clutch 166a is engaged, and engaged when the clutch 166a is disengaged.

The clutches 166, therefore, cooperate to connect either the input shaft 170 or the output shaft 172 to the cam shaft 174 in response to driving torque or braking torque, respectively.

Figure 27A:
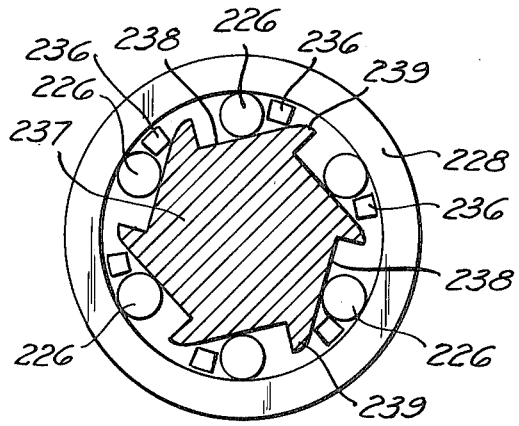
FIGS. 27A and 27B are partial cross-sectional views taken along the lines 27—27 of FIG. 23.
Figure 27B:
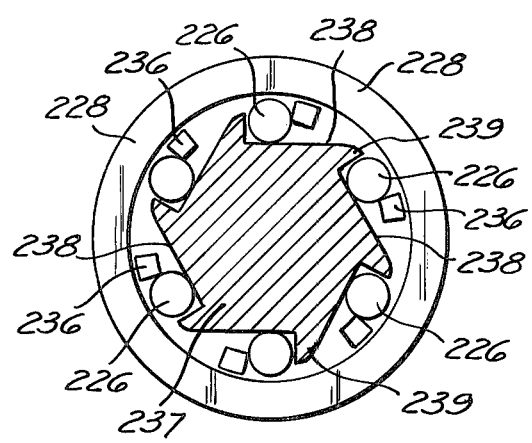

Referring again to FIG. 24, the clutch 164a includes the gears 176,178 and six roller bearings 226. The gear 176 comprises a sleeve 228 having a bore 230 slightly larger than a bore 232 in the remainder of the gear 176. A hexagonal lug 237 on the end of the follower crank shaft 160a receives the sleeve 228 of the gear 176 with each of the rollers 226 resting on a respective one of six flats 238 of the hexagonal lug 237, as shown in FIG. 27B. Each of the flats 238 has a retainer or projection 239 to retain the rollers 226 in the center of their respective flats 238 when the sleeve 228 is driven counterclockwise relative to the lug 237.

The gear 178 comprises a sleeve 234 sized to be rotatably mounted in the bore 232 of the gear 178. The sleeve 234 has six protrusions 236 extending axially from its periphery. The protrusions 236 are sized to fit within the bore 232 of the sleeve 228 without touching or inhibiting the rotation of the lug 237 or the sleeve 228, and are positioned to permit each of the rollers 226 to be disposed between one of the protrusions 236 and a respective one of the retainers 239, as shown in FIG. 27B.

When the protrusions 236 are positioned according to FIG. 27B, the rollers 226 are always retained in the center of their respective flats 238, since, when the sleeve 228 is rotated clockwise with respect to the lug 237, the rollers 226 will be retained by the protrusions 236, aand when the sleeve 228 is rotated counterclockwise relative to the lug 237, the rollers 226 will be retained by the retainers 237. Thus, the sleeve 228 will overrun the lug 237 in either direction. Therefore, FIG. 27B illustrates the overrunning mode of the clutch 164a. However, if the gear 178 is rotated slightly in a clockwise direction, the protrusions 236, which are an integral part of the gear 178, will also rotate clockwise from the position shown in FIG. 27B to the position shown in FIG. 27A. Such rotation of the protrusions 236 permits the rollers 226 to wedge between the sleeve 228 and the lug 237 when the sleeve 228 rotates clockwise with respect to the lug 237, but permits the sleeve 228 to overrun the lug 237 when rotated counterclockwise. Thus, FIG. 27A illustrates the driving mode of the clutch 164a. Therefore, by changing the position of the protrusions 236 according to FIGS. 27A and 27B, the clutch 164a will operate in either a driving mode or an overrunning mode.

Referring again to FIG. 23, the position of the protrusions 236 may be changed according to FIGS. 27A and 27B for driving torque and braking torque, respectively, by properly aligning the gear 182 with the gear 178 and the gear 180 with the gear 176. Specifically, the gears 176,178 and 180,182 are aligned to permit the gear 180 to be positioned relative to the input shaft 170 according to FIG. 25B when the protrusions 236 are positioned relative to the lug 237 according to FIG. 27B. Since FIGS. 25B and 27B illustrate the desired relationship of the shaft 170 to the gear 180, and the desired position of the protrusions 236, respectively, when driving torque is applied, such alignment of the gears 180,182 and 176,178, therefore, permits the clutch 164a to function properly in response to driving torque. However, when braking torque is applied, the input shaft 170 will rotate counterclockwise with respect to the gear 180 from the position shown in FIG. 25B to that shown in FIG. 25A. Since the gear 182 is splined to rotate with the input shaft 170, the gear 182 will also rotate counterclockwise relative the gear 180. Such counterclockwise rotation of the gear 182 will rotate the gear 178 and its protrusions clockwise. The gears 176,178 and 180,182 are sized, and the gear 180 is splined to permit the amount of such clockwise rotation of the gear 178 to position the protrusions 236 according to FIG. 27A. Thus, when braking torque is applied, the play between the splines of the gear 180 and the output shaft 170 permits the protrusions 236 to rotate clockwise from the position shown in FIG. 27B to the position shown in FIG. 27A. Therefore, the protrusions 236 are positioned according to FIG. 27A for braking torque and according to FIG. 27B for driving torque.

As previously mentioned, the position of the shaft 172 relative to the gear 188 is always the reverse of the position of the shaft 170 relative to the gear 180. That is, when viewed from the perspective of FIG. 23, the shaft 172 will be positioned relative to the gear 188, as shown in FIG. 25B for braking torque and as shown in FIG. 25A for driving torque. This permits the gear 190 of the clutch 166b to rotate the gear 186 and the protrusions (not shown) of the gear 164b in a direction opposite from the rotation of the gear 178 and the protrusions 236 of the clutch 164a. Thus, since the clutch 164b is a mirror image of the clutch 164a and is disposed 180 degrees relative to the clutch 164a, such opposite rotation of the protrusions of the clutch 164b will permit the clutch 164b to operate in a mode opposite that of the clutch 164a. Therefore, when driving torque is applied, the clutch 164b will operate in a driving mode according to FIG. 27A, and when braking torque is applied, the clutch 164b will operate in an overrunning mode according to FIG. 27B.

The clutches 164, therefore, cooperate with the clutches 166 to permit only the clutch 164b to operate in a driving mode when driving torque is applied, and only the clutch 164a to operate in a driving mode when braking torque is applied. Further, such cooperation of the clutches 164,166 permits the clutch 164a to operate in an overrunning mode when the clutch 164b operates in a driving mode, and permits the clutch 164b to operate in an overrunning mode when the clutch 164a operates in a driving mode.

Referring to FIG. 22, the gear ratio of the transmission may be changed by sliding the cam 150 along the cam shaft 174 to permit the eccentricity of the cam 150 to vary at its driving point, in the manner discussed in reference to FIGS. 12 and 17. The cam shaft 174 includes a helical spline or key 194 which mates with a corresponding helical spline or keyway 196 in the bore of the cam 150. A helical biasing spring 198, retained by a spring cup 199, is provided to bias the cam 150 towards the output shaft 172. Thus, the cam 150 is normally biased towards its position of highest gear ratio, since such biasing permits the follower arm 152 to be aligned with the cam 150 at the point of maximum cam eccentricity. As discussed in reference to FIG. 17, the cam 150 will travel along the cam shaft 174 to a position of lower gear ratio if the biasing force created by the interaction of the spring 198 with the helical splines 194,196 is overcome by the torque force created by the interaction of the cam 150 with the follower arm 152. Such travel of the cam 150 will continue until a point of equilibrium between the biasing force and the torque is reached. At this point of equilibrium, the cam 150 and the cam shaft 174 will rotate synchronously and the gear ratio will be constant. Thus, the transmission gear ratio automatically adjusts the response to the torque created by the interaction of the follower 152 with the cam 150. Although FIG. 22 illustrates means for adjusting the gear ratio automatically, it will be understood that the gear ratio of the transmission of FIG. 22 may also be adjusted manually. For example, manual adjustment may be accomplished by a shifting fork or other means well known in the art. A clutch (not shown) may be provided between the engine and transmission to permit the transmission to be disengaged from the engine.

What is claimed is:

1. A mechanical transmission, comprising:
   a cam having at lest one lobe, said lobe tapered in the direction of the axis of said cam to provide a cam lift which changes along the axis of said cam;
   plural cam followers, each mounted on a shaft which straddles said cam, said shaft mounted on a pair of bearings at opposite ends of said cam, said bearings providing a rotational axis for said followers, said followers each including a follower arm contacting said cam;
   input drive means for relatively rotating said cam and said rotational axes of each follower;
   said rotational axis intercepting the rotational path of said cam lobe;
   means for combining the oscillation of said plural followers to provide an output drive;
   said cam and said followers formed and relatively positioned to provide constant velocity output drive at said combining means when said input drive means has constant velocity; and
   means for relatively adjusting the location of said plural cam followers along said axis of said cam to change the location of contact between said follower arms and said cam and thereby adjust the gear ratio of said transmission.

2. A mechanical transmission, as defined in claim 1, wherein said gear ratio is neutral when the location of said contact between the follower arms and said cam is at one end of said cam.

3. A mechanical transmission, as defined in claim 1, wherein said means for relatively adjusting automatically adjusts said location in response to the torque supplied to said transmission.

4. A mechanical transmission, as defined in claim 1, wherein said relatively adjusting means permits manual adjustment of said location.

5. A mechanical transmission, as defined in claim 1, wherein said tapered cam lobe provides constant velocity output drive at said combining means at all transmission gear ratios when said input drive means has constant velocity.

6. A mechanical transmission, as defined in claim 1, wherein said combining means comprises:
   a housing mounting said pair of bearings in a fixed position;
   an output shaft mounted for rotation on said housing; and
   plural clutches connecting said plural cam followers to said output shaft.

7. A mechanical transmission, as defined in claim 1, wherein said cam lobe has a constant velocity lift profile through a rotational segment of said cam which is greater than 360 degrees divided by the product of the number of said plural followers and the number of lobes on said cam.

8. A mechanical transmission, as defined in claim 1, wherein said cam has plural lobes.

9. A mechanical transmission, comprising:
   a cam having at least one lobe;
   plural cam followers, each mounted for oscillation about a rotational axis, said followers each including a follower arm contacting said cam, said plural cam followers each mounted on a physical axis which is inclined relative said rotational axis;
   input drive means for relatively rotating said cam and said follower axis of each follower;
   means for combining the oscillation of said plural followers to provide an output drive; and
   said cam and said followers formed and relatively positioned to provide constant velocity output drive at said combining means when said input drive means has constant velocity.

10. A mechanical transmission, as defined in claim 9, wherein said combining means comprises a constant velocity universal joint.

11. A variable gear ratio transmission comprising:
    an input shaft;
    an output shaft;
    a cam driven by said input shaft;
    plural crank shafts each rotationally mounted on opposite sides of said cam and each rotating about a shaft rotational axis which intercepts the path of said cam;
    plural cam follows, one of said followers mounted on each of said crank shafts, driven by said cam, and driving said output shaft; and means for adjusting the relative positions of said cam and said plural cam followers to adjust in infinite increments the gear ratio of said transmission.

12. A variable gear ratio transmission, as defined in claim 11, wherein said cam includes at least one lobe having an acceleration surface followed by a constant velocity surface followed by a deceleration surface.

13. A variable gear ratio transmission, as defined in claim 11, wherein said constant velocity rotation of said output shaft is provided by overlapping constant velocity rotational segments of each of said plural cam followers.

14. A variable gear ratio transmission, as defined in claim 11, wherein said adjusting means automatically adjusts the relative positions of said cam and said plural cam followers in response to the torque applied to said transmission.

15. A variable gear ratio transmission, as defined in claim 14, wherein said adjusting means comprises a biasing means biasing said transmission toward higher gear ratios, said biasing means opposed by torque applied to said transmission.

16. A variable gear ratio transmission, as defined in claim 11, wherein said adjusting means permits manual adjustment of said transmission gear ratio.

17. A variable gear ratio transmission, as defined in claim 11, wherein said adjusting means adjusts the relative positions of said cam and said plural cam followers in a direction parallel to the axis of said cam.

18. A variable gear ratio transmission, as defined in claim 11, wherein said cam is shaped as an involute.

19. A variable gear ratio transmission, as defined in claim 11, additionally comprising:
plural one-way clutches connecting said plural cam followers to said output shaft, said clutches combining the movement of said plural cam followers to drive said output shaft.

20. A variable gear ratio transmission, comprising:
an input shaft;
an output shaft;
a cam driven by said input shaft;
said cam including at least one lobe having an acceleration surface followed by a constant velocity surface followed by a deceleration surface, the rate of acceleration provided by said acceleration surface being constant;
plural cam followers driven by said cam and driving said output shaft;
means for adjusting the relative positions of said cam and said plural cam followers to adjust in infinite increments the gear ratio of said transmission; and
said cam and plural followers shaped and positioned to provide constant velocity rotation of said output shaft when said input shaft rotates at constant velocity.

21. A variable gear ratio transmission, as defined in claim 20, wherein the rate of deceleration provided by said deceleration surface is constant.

22. A variable gear ratio transmission, comprising:
an input shaft;
an output shaft;
a cam driven by said input shaft;
plural cam followers driven by said cam and driving said output shaft;
means for adjusting the relative positions of said cam and said plural cam followers to adjust in infinite increments the gear ratio of said transmission;
said cam and plural followers shaped and positioned to provide constant velocity rotation of said output shaft when said input shaft rotates at constant velocity;
a housing;
plural gear segments, each of said gear segments having a radius and an axis, said axis being closer in the radial direction of said segment to said housing than said radius, said gear segments connected to be driven by said plural cam followers;
plural one way clutches mounted on said output shaft connecting said plural gear segments to said output shaft, said clutches combining the movement of said plural gear segments to said plural gear segments to drive said output shaft.

23. A variable gear ratio transmission, as defined in claim 19, additionally comprising:
wherein each of said plural cam followers comprises a follower shaft and a follower arm mounted on said follower shaft; and
said clutches are mounted on said plural follower shafts.

24. A variable gear ratio transmission, comprising:
a housing;
a cam within said housing having at least one lobe;
plural cam follower arms mounted on said housing at opposite ends of said cam to straddle said cam, to be oscillated by said cam as said cam rotates and to thus provide the output drive for said transmission;
means for relatively rotating said cam and said housing to provide the input drive for said transmission; and
plural shafts mounting said plural cam follower arms, said cam lobe rotating through the rotational axes of said cam follower arms, but not through the physical locations of said plural shafts, to increase the gear ratio of said transmission.

25. A variable gear ratio transmission, as defined in claim 24, wherein said plural shafts mounting said plural cam follower arms are offset at both of their respective ends relative said rotational axes of said cam follower arms.

26. A variable gear ratio transmission, as defined in claim 24, wherein said cam includes a driving surface which provides constant velocity rotation of said follower arms about said rotational axes when said cam is driven at constant velocity.

27. A variable gear ratio transmission, as defined in claim 24, additionally comprising:
means combining the oscillation of said plural follower arms to provide a smooth output for said transmission.

28. A variable gear ratio transmission, comprising:
a cam providing the input drive for said transmission, said cam having at least one lobe;
plural cam follower arms mounted to be oscillated by said cam as said cam rotates and to thus provide the output drive for said transmission; and
plural shafts mounting said plural cam follower arms, said cam lobe rotating through the rotational axes of said cam follower arms, but not through the physical locations of said plural shafts, to increase the gear ratio of said transmission, said plural shafts inclined relative and rotational axes of said cam follower arms.

29. A variable gear ratio transmission, as defined in claim 28, additionally comprising:

plural U-joints connecting said plural shafts mounting said plural cam follower arms to provide the output drive for said transmission.

30. A variable gear ratio transmission, comprising:
an input shaft;
a cam;
plural cam followers driven by said cam;
an output shaft;
means for providing a first operational mode by connecting said input shaft to drive said cam and connecting said plural followers to drive said output shaft; and
means for providing a second operational mode by connecting said output shaft to drive said cam and connecting said plural followers to drive said input shaft.

31. A variable gear ratio transmission, as defined in claim 30, wherein said first and second operational modes each provide rotation of said cam in the same direction.

32. A variable gear ratio transmission, as defined in claim 30, additionally comprising:
means connecting said input shaft to an automobile engine; and
means connecting said output shaft to the wheels of said automobile.

33. A variable gear ratio transmission, as defined in claim 30, wherein said cam comprises lobes which are tapered in a direction parallel to the axis of said cam, said transmission additionally comprising:
means for varying the relative position of said plural cam followers and said cam in a direction parallel to the axis of said cam to vary the gear ratio of said transmission.

34. A variable gear ratio transmission, as defined in claim 33, wherein said means for adjusting responds automatically to the torque applied to said transmission to permit a variable speed at said output shaft with constant speed at said input shaft.

35. A variable gear ratio transmission, as defined in claim 30, additionally comprising:
means for automatically changing from said first operational mode to said second operational mode in response to the direction of torque applied to said transmission.

36. A variable gear ratio transmission, as defined in claim 30, wherein said means for providing a first operational mode comprises clutches connecting said cam to said input shaft and disconnecting said cam from said output shaft.

37. A variable gear ratio transmission, as defined in claim 30, wherein said means for providing said second operational mode comprises clutches for connecting said output shaft to said cam and disconnecting said input shaft from said cam.

38. A variable gear ratio transmission, as defined in claim 37, wherein said means for providing a second operational mode further comprises:
clutches connecting said plural followers to said input shaft and disconnecting said plural followers from said output shaft.

39. A variable gear ratio transmission, as defined in claim 30, wherein said cam and said plural cam followers are formed and relatively positioned to provide a constant velocity transmission output when the input to said transmission is at constant velocity.

40. A variable gear ratio transmission, as defined in claim 30, wherein said plural cam followers comprise:
plural shafts mounting plural follower arms for rotation about said plural follower arm rotational axes, the respective physical axes of said shafts each offset from the rotational axes of their respective follower arms.

41. A variable speed transmission, comprising:
a cam, providing the input drive for said transmission;
plural cam follower arms oscillated at constant velocity by said cam to provide the output drive for said transmission;
a cam roller, mounted for rotation about a roller axis on each said cam follower arm, and contacting said cam; and
said roller axis of each of said follower arms moving in a respective arcuate path when said cam drives said followers at constant velocity to provide the output drive for said transmission, the chord connecting the ends of each said arcuate path passing through the axis of rotation of said cam when said transmission is at its highest gear ratio.

42. A variable speed transmission, as defined in claim 41, wherein said cam has lobes, tapered in a direction parallel to the axis of said cam, said transmission additionally comprising:
means for varying the relative position of said plural cam followers and said cam in a direction parallel to the axis of said cam to provide various gear ratios for said transmission, said respective arcuate paths of each of said followers varying according to said various gear ratios; and
said plural follower arms oriented relative to said cam to permit the chords defined by the ends of said varying arcuate paths of one of said followers at said various gear ratios to be mutually parallel.

43. A variable speed transmission, as defined in claim 41, wherein said cam may be rotated in either direction about its axis to oscillate said plural followers.

44. A variable speed transmission, as defined in claim 41, additionally comprising:
plural shafts mounting said plural cam follower arms for rotation about plural cam follower arm rotational axes, said cam positioned so that the lobe of said cam rotates through said plural rotational axes.

45. A transmission having a cam and plural cam followers, wherein the cam is tapered to provide varying lift rates as its position relative the followers is adjusted, said followers providing the output drive for said transmission through one-way clutches driving a common output shaft, wherein the improvement comprises:
a driving surface on said cam which is shaped to provide constant velocity rotation of said output shaft when said cam is rotated at constant velocity regardless of the direction of rotation of said cam.

46. A transmission, as defined in claim 45, wherein said cam is tapered in a direction parallel to the rotational axis of said cam to provide a variable gear ratio for said transmission, said cam providing said driving surface shaped to provide constant velocity rotation at all points along the taper of said cam.

47. A transmission, as defined in claim 46, additionally comprising:
means for adjusting the relative position of said cam and said plural cam followers in a direction parallel to the rotational axis of said cam to adjust the gear ratio of said transmission.

48. A transmission, as defined in claim 47, wherein said means for adjusting operates automatically in response to the torque applied to said transmission.

49. A transmission, as defined in claim 47, wherein said adjusting means is manual.

50. A transmission, comprising:
a cam, driven by an input shaft, including a driving cam surface including:
(a) a constant acceleration surface;
(b) a constant velocity surface; and
(c) a constant deceleration surface;
plural followers driven to oscillate by said cam, said followers rotating at a uniform velocity when contacting said constant velocity surface and when said cam is rotated at constant velocity; and
means connecting said plural followers to drive an output transmission shaft.

51. A transmission, as defined in claim 50, wherein said means connecting said plural followers comprises plural one-way clutches which combine said uniform velocity of said plural followers to provide a smooth output drive for said output transmission shaft.

52. A variable gear ratio transmission, comprising:
a housing;
a cam having at least one lobe, said lobe tapered in the direction of the axis of said cam to provide a cam lift which changes along the axis of said cam;
plural cam followers, each mounted for oscillation about a rotational axis, said followers each including a follower arm contacting said cam;
input drive means for relatively rotating said cam and said rotational axis of each follower; and
means for combining the oscillation to said plural followers to provide an output drive, said means comprising:
plural gear segments, each of said gear segments having a radius and an axis, said axis being closer in the radial direction of said gear segment, to said housing than said radius, said gear segments each mounted to rotate with one of said followers;
a shaft;
plural one-way clutches mounted on said shaft; and
a gear mounted on each of said clutches, each said gear meshing with one of said gear segments.

* * * * *